(12) United States Patent
Nagavarapu et al.

(10) Patent No.: US 10,220,345 B2
(45) Date of Patent: *Mar. 5, 2019

(54) APPARATUS AND SYSTEM FOR SWING ADSORPTION PROCESSES RELATED THERETO

(71) Applicants: Ananda K. Nagavarapu, Houston, TX (US); Bennett D. Marshall, Conroe, TX (US)

(72) Inventors: Ananda K. Nagavarapu, Houston, TX (US); Bennett D. Marshall, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/233,649

(22) Filed: Aug. 10, 2016

(65) Prior Publication Data

US 2017/0056811 A1    Mar. 2, 2017

Related U.S. Application Data

(60) Provisional application No. 62/370,977, filed on Aug. 4, 2016, provisional application No. 62/213,267, filed on Sep. 2, 2015.

(51) Int. Cl.
*B01D 53/047* (2006.01)
*F25J 3/02* (2006.01)
(Continued)

(52) U.S. Cl.
CPC ....... *B01D 53/047* (2013.01); *B01D 53/0407* (2013.01); *C10L 3/104* (2013.01);
(Continued)

(58) Field of Classification Search
CPC ............. B01D 53/0473; B01D 53/047; B01D 53/0462; B01D 53/0407; B01D 2257/504;
(Continued)

(56) References Cited

U.S. PATENT DOCUMENTS 1,868,138 A    7/1932  Fisk
3,103,425 A    9/1963  Meyer ............................. 55/62
(Continued)

FOREIGN PATENT DOCUMENTS

CA    2297590    9/2000
CA    2237103    12/2001
(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.
(Continued)

*Primary Examiner* — Frank M Lawrence, Jr.
(74) *Attorney, Agent, or Firm* — ExxonMobil Upstream Research Company—Law Department

(57) ABSTRACT

Provided are apparatus and systems for performing a swing adsorption process. This swing adsorption process may involve passing streams through adsorbent bed units to remove contaminants, such as water, from the stream. As part of the process, the adsorbent bed unit is purged with a purge stream that is provided from the overhead of the demethanizer. The configuration integrates a RCTSA dehydration system with a cryogenic recovery system.

29 Claims, 5 Drawing Sheets

(51) Int. Cl.
*B01D 53/04* (2006.01)
*F25J 3/06* (2006.01)
*C10L 3/10* (2006.01)

(52) U.S. Cl.
CPC .............. *C10L 3/106* (2013.01); *F25J 3/061* (2013.01); *B01D 2257/504* (2013.01); *B01D 2257/80* (2013.01); *B01D 2259/40013* (2013.01); *B01D 2259/40054* (2013.01); *B01D 2259/40086* (2013.01); *C10L 2290/542* (2013.01)

(58) Field of Classification Search
CPC ...... B01D 2257/80; B01D 2259/40013; B01D 2259/40054; B01D 2259/40086; C10L 3/104; C10L 3/106; C10L 2290/542; F25J 3/061
USPC .................. 96/108, 121, 126–128, 143, 144; 95/96–99, 104–106, 117, 122–124, 139; 62/618
See application file for complete search history.

(56) References Cited

U.S. PATENT DOCUMENTS

| | | | |
|---|---|---|---|
| 3,124,152 A | 3/1964 | Payne | 137/269.5 |
| 3,142,547 A | 7/1964 | Marsh et al. | 55/26 |
| 3,508,758 A | 4/1970 | Strub | 277/15 |
| 3,602,247 A | 8/1971 | Bunn et al. | 137/270 |
| 3,788,036 A | 1/1974 | Lee et al. | 55/25 |
| 3,967,464 A | 7/1976 | Cormier et al. | 62/13 |
| 4,187,092 A | 2/1980 | Woolley | 62/48 |
| 4,261,815 A | 4/1981 | Kelland | 209/213 |
| 4,324,565 A | 4/1982 | Benkmann | 55/23 |
| 4,325,565 A | 4/1982 | Winchell | 280/282 |
| 4,329,162 A | 5/1982 | Pitcher | 55/523 |
| 4,340,398 A | 7/1982 | Doshi et al. | 55/25 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,752,311 A * | 6/1988 | MacLean | B01D 53/04 62/624 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,877,429 A | 10/1989 | Hunter | 55/162 |
| 4,977,745 A | 12/1990 | Heichberger | 62/10 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,281,258 A * | 1/1994 | Markovs | B01D 53/002 423/210 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,486,227 A | 1/1996 | Kumar et al. | |
| 5,547,641 A | 8/1996 | Smith et al. | 422/181 |
| 5,565,018 A | 10/1996 | Baksh et al. | 95/100 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,769,928 A | 6/1998 | Leavitt | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,912,426 A | 6/1999 | Smolarek et al. | |
| 5,924,307 A | 7/1999 | Nenov | 62/643 |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,096,115 A | 8/2000 | Kleinberg et al. | |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,152,991 A | 11/2000 | Ackley | |
| 6,156,101 A | 12/2000 | Naheiri | |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,183,538 B1 | 2/2001 | Naheiri | |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,425,938 B1 | 7/2002 | Xu et al. | |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,939 B1 | 10/2002 | Boix et al. | 423/706 |
| 6,488,747 B1 | 12/2002 | Keefer et al. | 96/125 |
| 6,497,750 B2 | 12/2002 | Butwell et al. | 95/96 |
| 6,500,234 B1 | 12/2002 | Ackley et al. | |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B1 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |
| 6,630,012 B2 | 10/2003 | Wegeng et al. | 95/106 |
| 6,631,626 B1 | 10/2003 | Hahn | 62/612 |
| 6,641,645 B1 | 11/2003 | Lee et al. | 95/98 |
| 6,651,645 B1 | 11/2003 | Nunez-Suarez | 196/9 R |
| 6,660,064 B2 | 12/2003 | Golden et al. | 95/96 |
| 6,660,065 B2 | 12/2003 | Byrd et al. | 95/117 |
| 6,692,626 B2 | 2/2004 | Keefer et al. | 204/491 |
| 6,712,087 B2 | 3/2004 | Hill et al. | 137/240 |
| 6,742,507 B2 | 6/2004 | Keefer et al. | 123/585 |

(56) References Cited

U.S. PATENT DOCUMENTS

| | | | |
|---|---|---|---|
| 6,746,515 B2 | 6/2004 | Wegeng et al. ................. 95/96 |
| 6,752,852 B1 | 6/2004 | Jacksier et al. ................ 95/117 |
| 6,770,120 B2 | 8/2004 | Neu et al. ......................... 95/96 |
| 6,773,225 B2 | 8/2004 | Yuri et al. .......................... 415/1 |
| 6,802,889 B2 | 10/2004 | Graham et al. .................. 95/96 |
| 6,814,771 B2 | 11/2004 | Scardino et al. ............. 55/385.3 |
| 6,835,354 B2 | 12/2004 | Woods et al. ................. 422/139 |
| 6,840,985 B2 | 1/2005 | Keefer .......................... 96/125 |
| 6,866,950 B2 | 3/2005 | Connor et al. .................. 429/13 |
| 6,889,710 B2 | 5/2005 | Wagner ................... 137/625.46 |
| 6,890,376 B2 | 5/2005 | Arquin et al. ................. 96/134 |
| 6,893,483 B2 | 5/2005 | Golden et al. .................... 95/96 |
| 6,902,602 B2 | 6/2005 | Keefer et al. ..................... 95/97 |
| 6,916,358 B2 | 7/2005 | Nakamura et al. ................ 95/96 |
| 6,918,953 B2 | 7/2005 | Lomax, Jr. et al. ............. 96/130 |
| 6,921,597 B2 | 7/2005 | Keefer et al. .................... 429/34 |
| 6,974,496 B2 | 12/2005 | Wegeng et al. ................. 96/126 |
| 7,025,801 B2 | 4/2006 | Monereau .......................... 95/8 |
| 7,027,929 B2 | 4/2006 | Wang ............................ 702/17 |
| 7,029,521 B2 | 4/2006 | Johansson ...................... 96/128 |
| 7,074,323 B2 | 7/2006 | Ghijsen ........................ 208/101 |
| 7,077,891 B2 | 7/2006 | Jaffe et al. ..................... 96/108 |
| 7,087,331 B2 | 8/2006 | Keefer et al. .................... 429/17 |
| 7,094,275 B2 | 8/2006 | Keefer et al. ................... 96/125 |
| 7,097,925 B2 | 8/2006 | Keefer et al. ...................... 429/9 |
| 7,112,239 B2 | 9/2006 | Kimbara et al. ................ 96/108 |
| 7,117,669 B2 | 10/2006 | Kaboord et al. ................ 60/288 |
| 7,122,073 B1 | 10/2006 | Notaro et al. |
| 7,128,775 B2 | 10/2006 | Celik et al. ....................... 95/96 |
| 7,144,016 B2 | 12/2006 | Gozdawa ...................... 277/399 |
| 7,160,356 B2 | 1/2007 | Koros et al. ..................... 95/50 |
| 7,160,367 B2 | 1/2007 | Babicki et al. ................. 96/116 |
| 7,166,149 B2 | 1/2007 | Dunne et al. .................. 95/113 |
| 7,172,645 B1 | 2/2007 | Pfister et al. .................. 95/116 |
| 7,189,280 B2 | 3/2007 | Alizadeh-Khiavi et al. ... 95/130 |
| 7,250,073 B2 | 7/2007 | Keefer et al. ..................... 95/96 |
| 7,250,074 B2 | 7/2007 | Tonkovich et al. ............. 95/130 |
| 7,255,727 B2 | 8/2007 | Monereau et al. ............... 95/96 |
| 7,258,725 B2 | 8/2007 | Ohmi et al. ...................... 95/41 |
| 7,276,107 B2 | 10/2007 | Baksh et al. ...................... 95/96 |
| 7,279,029 B2 | 10/2007 | Occhialini et al. .............. 96/121 |
| 7,285,350 B2 | 10/2007 | Keefer et al. .................... 429/34 |
| 7,297,279 B2 | 11/2007 | Johnson et al. ............... 210/669 |
| 7,311,763 B2 | 12/2007 | Neary ............................ 96/121 |
| RE40,006 E | 1/2008 | Keefer et al. ................... 95/100 |
| 7,314,503 B2 | 1/2008 | Landrum et al. ................ 95/50 |
| 7,354,562 B2 | 4/2008 | Ying et al. ................. 423/437.2 |
| 7,387,849 B2 | 6/2008 | Keefer et al. .................... 429/34 |
| 7,390,350 B2 | 6/2008 | Weist, Jr. et al. .............. 95/100 |
| 7,404,846 B2 | 7/2008 | Golden et al. ................. 95/103 |
| 7,438,079 B2 | 10/2008 | Cohen et al. |
| 7,449,049 B2 | 11/2008 | Thomas et al. ................. 95/123 |
| 7,456,131 B2 | 11/2008 | Klett et al. .................... 502/417 |
| 7,510,601 B2 | 3/2009 | Whitley et al. ................. 96/121 |
| 7,527,670 B2 | 5/2009 | Ackley et al. .................... 95/96 |
| 7,553,568 B2 | 6/2009 | Keefer ............................ 429/13 |
| 7,578,864 B2 | 8/2009 | Watanabe et al. .............. 55/523 |
| 7,604,682 B2 | 10/2009 | Seaton ............................. 95/96 |
| 7,637,989 B2 | 12/2009 | Bong ............................. 96/130 |
| 7,641,716 B2 | 1/2010 | Lomax, Jr. et al. ............... 95/96 |
| 7,645,324 B2 | 1/2010 | Rode et al. ....................... 95/96 |
| 7,651,549 B2 | 1/2010 | Whitley ........................... 95/96 |
| 7,674,319 B2 | 3/2010 | Lomax, Jr. et al. ............... 95/19 |
| 7,674,539 B2 | 3/2010 | Keefer et al. .................... 429/17 |
| 7,687,044 B2 | 3/2010 | Keefer et al. .................. 422/211 |
| 7,713,333 B2 | 5/2010 | Rege et al. ....................... 95/96 |
| 7,717,981 B2 | 5/2010 | LaBuda et al. ................... 95/96 |
| 7,722,700 B2 | 5/2010 | Sprinkle ........................... 95/22 |
| 7,731,782 B2 | 6/2010 | Kelley et al. ................... 95/139 |
| 7,740,687 B2 | 6/2010 | Reinhold, III .................... 95/96 |
| 7,744,676 B2 | 6/2010 | Leitmayr et al. ................. 95/99 |
| 7,744,677 B2 | 6/2010 | Barclay et al. .................. 95/114 |
| 7,758,051 B2 | 7/2010 | Roberts-Haritonov et al. ............ 277/401 |
| 7,758,988 B2 | 7/2010 | Keefer et al. .................... 429/34 |
| 7,763,098 B2 | 7/2010 | Alizadeh-Khiavi et al. ..... 95/96 |
| 7,763,099 B2 | 7/2010 | Verma et al. ..................... 95/96 |
| 7,792,983 B2 | 9/2010 | Mishra et al. ................. 709/231 |
| 7,793,675 B2 | 9/2010 | Cohen et al. |
| 7,806,965 B2 | 10/2010 | Stinson .......................... 95/187 |
| 7,819,948 B2 | 10/2010 | Wagner .......................... 95/100 |
| 7,828,877 B2 | 11/2010 | Sawada et al. .................. 95/96 |
| 7,828,880 B2 | 11/2010 | Moriya et al. .................. 95/210 |
| 7,854,793 B2 | 12/2010 | Rarig et al. ..................... 96/116 |
| 7,858,169 B2 | 12/2010 | Yamashita .................... 428/116 |
| 7,862,645 B2 | 1/2011 | Whitley et al. ................... 95/96 |
| 7,867,320 B2 | 1/2011 | Baksh et al. ...................... 95/96 |
| 7,902,114 B2 | 3/2011 | Keefer et al. |
| 7,938,886 B2 | 5/2011 | Hershkowitz et al. ......... 95/115 |
| 7,947,118 B2 | 5/2011 | Rarig et al. ...................... 95/98 |
| 7,947,120 B2 | 5/2011 | Deckman et al. .............. 95/139 |
| 7,959,720 B2 | 6/2011 | Deckman et al. .............. 96/130 |
| 8,016,918 B2 | 9/2011 | LaBuda et al. ................... 95/96 |
| 8,034,164 B2 | 10/2011 | Lomax, Jr. et al. ............ 95/121 |
| 8,071,063 B2 | 12/2011 | Reyes et al. .................. 423/248 |
| 8,128,734 B2 | 3/2012 | Song ................................ 95/96 |
| 8,142,745 B2 | 3/2012 | Reyes et al. ............... 423/213.2 |
| 8,142,746 B2 | 3/2012 | Reyes et al. ............... 423/213.2 |
| 8,192,709 B2 | 6/2012 | Reyes et al. ............... 423/245.1 |
| 8,210,772 B2 | 7/2012 | Gillecriosd ................. 405/128.2 |
| 8,227,121 B2 | 7/2012 | Adams et al. ................. 429/429 |
| 8,262,773 B2 | 9/2012 | Northrop et al. ............... 95/114 |
| 8,262,783 B2 | 9/2012 | Stoner et al. ................... 96/108 |
| 8,268,043 B2 | 9/2012 | Celik et al. ....................... 95/96 |
| 8,268,044 B2 | 9/2012 | Wright et al. .................... 95/96 |
| 8,272,401 B2 | 9/2012 | McLean ................... 137/625.11 |
| 8,287,629 B2 | 10/2012 | Fujita et al. .................... 96/126 |
| 8,319,090 B2 | 11/2012 | Kitamura ..................... 136/244 |
| 8,337,594 B2 | 12/2012 | Corma Canos et al. ........ 95/130 |
| 8,361,200 B2 | 1/2013 | Sayari et al. ................... 95/139 |
| 8,361,205 B2 | 1/2013 | Desai et al. .................... 96/121 |
| 8,377,173 B2 | 2/2013 | Chuang ......................... 95/135 |
| 8,444,750 B2 | 5/2013 | Deckman et al. ................ 95/96 |
| 8,470,395 B2 | 6/2013 | Khiavi et al. ................. 427/180 |
| 8,480,795 B2 | 7/2013 | Siskin et al. ................... 95/235 |
| 8,512,569 B2 | 8/2013 | Eaton et al. ................... 210/650 |
| 8,518,356 B2 | 8/2013 | Schaffer et al. .............. 423/220 |
| 8,529,662 B2 | 9/2013 | Kelley et al. ..................... 95/96 |
| 8,529,663 B2 | 9/2013 | Reyes et al. ..................... 95/96 |
| 8,529,664 B2 | 9/2013 | Deckman et al. ................ 95/96 |
| 8,529,665 B2 | 9/2013 | Manning et al. ................. 95/96 |
| 8,535,414 B2 | 9/2013 | Johnson et al. .................. 95/95 |
| 8,545,602 B2 | 10/2013 | Chance et al. ................... 95/96 |
| 8,551,444 B2 | 10/2013 | Agnihotri et al. .......... 423/648.1 |
| 8,573,124 B2 | 11/2013 | Havran et al. ................. 102/206 |
| 8,591,627 B2 | 11/2013 | Jain ................................ 95/52 |
| 8,591,634 B2 | 11/2013 | Winchester et al. ............ 96/127 |
| 8,616,233 B2 | 12/2013 | McLean et al. .......... 137/246.22 |
| 8,657,922 B2 | 2/2014 | Yamawaki et al. .............. 95/96 |
| 8,673,059 B2 | 3/2014 | Leta et al. ...................... 95/104 |
| 8,680,344 B2 | 3/2014 | Weston et al. |
| 8,715,617 B2 | 5/2014 | Genkin et al. ................ 423/652 |
| 8,752,390 B2 | 6/2014 | Wright et al. .................. 60/780 |
| 8,778,051 B2 | 7/2014 | Weist, Jr. et al. ................ 95/98 |
| 8,784,533 B2 | 7/2014 | Leta et al. ........................ 95/97 |
| 8,784,534 B2 | 7/2014 | Kamakoti et al. ................ 95/97 |
| 8,784,535 B2 | 7/2014 | Ravikovitch et al. ............ 95/98 |
| 8,795,411 B2 | 8/2014 | Hufton et al. .................... 95/90 |
| 8,808,425 B2 | 8/2014 | Genkin et al. .................... 95/96 |
| 8,808,426 B2 | 8/2014 | Sundaram ........................ 95/96 |
| 8,814,985 B2 | 8/2014 | Gerds et al. ...................... 95/90 |
| 8,852,322 B2 | 10/2014 | Gupta et al. ................... 95/136 |
| 8,858,683 B2 | 10/2014 | Deckman ........................ 95/96 |
| 8,875,483 B2 | 11/2014 | Wettstein .................... 60/39.52 |
| 8,906,138 B2 | 12/2014 | Rasmussen et al. .............. 95/96 |
| 8,921,637 B2 | 12/2014 | Sundaram et al. ............. 585/823 |
| 8,939,014 B2 | 1/2015 | Kamakoti et al. ................ 73/38 |
| 9,005,561 B2 | 4/2015 | Leta |
| 9,017,457 B2 | 4/2015 | Tammera ........................ 95/96 |
| 9,028,595 B2 | 5/2015 | Sundaram et al. |
| 9,034,078 B2 | 5/2015 | Wanni et al. ...................... 95/8 |
| 9,034,079 B2 | 5/2015 | Deckman et al. ................ 95/96 |
| 9,050,553 B2 | 6/2015 | Alizadeh-Khiavi et al. |
| 9,067,168 B2 | 6/2015 | Frederick et al. .............. 96/108 |

(56) References Cited

U.S. PATENT DOCUMENTS

| | | |
|---|---|---|
| 9,095,809 B2 | 8/2015 | Deckman et al. .............. 95/45 |
| 9,108,145 B2 | 8/2015 | Kalbassi et al. ................ 95/8 |
| 9,120,049 B2 | 9/2015 | Sundaram et al. ............ 96/121 |
| 9,126,138 B2 | 9/2015 | Deckman et al. .............. 95/95 |
| 9,162,175 B2 | 10/2015 | Sundaram .................... 96/121 |
| 9,168,485 B2 | 10/2015 | Deckman et al. .............. 95/96 |
| 2001/0047824 A1 | 12/2001 | Hill et al. ................... 137/312 |
| 2002/0053547 A1 | 5/2002 | Schlegel et al. |
| 2002/0124885 A1 | 9/2002 | Hill et al. ................... 137/312 |
| 2002/0162452 A1 | 11/2002 | Butwell et al. ................. 95/96 |
| 2003/0075485 A1 | 4/2003 | Ghijsen ...................... 208/308 |
| 2003/0129101 A1 | 7/2003 | Zettel ......................... 422/179 |
| 2003/0131728 A1 | 7/2003 | Kanazirev et al. ............. 95/96 |
| 2003/0170527 A1 | 9/2003 | Finn et al. ................... 429/34 |
| 2003/0202918 A1 | 10/2003 | Ashida et al. ............... 422/180 |
| 2003/0205130 A1 | 11/2003 | Neu et al. ...................... 95/90 |
| 2003/0223856 A1 | 12/2003 | Yuri et al. ...................... 415/1 |
| 2004/0099142 A1 | 5/2004 | Arquin et al. ............... 96/134 |
| 2004/0118277 A1 | 6/2004 | Kim |
| 2004/0197596 A1 | 10/2004 | Connor et al. ............... 428/630 |
| 2004/0232622 A1 | 11/2004 | Gozdawa ..................... 277/401 |
| 2005/0109419 A1 | 5/2005 | Ohmi et al. .................... 141/4 |
| 2005/0114032 A1 | 5/2005 | Wang .......................... 702/14 |
| 2005/0129952 A1 | 6/2005 | Sawada et al. .............. 428/409 |
| 2005/0014511 A1 | 7/2005 | Keefer et al. ................ 96/124 |
| 2005/0145111 A1 | 7/2005 | Keefer et al. ................ 96/124 |
| 2005/0150378 A1 | 7/2005 | Dunne et al. ............... 95/113 |
| 2005/0229782 A1 | 10/2005 | Monereau et al. ............ 95/96 |
| 2005/0252378 A1 | 11/2005 | Celik et al. .................. 96/121 |
| 2006/0017940 A1 | 1/2006 | Takayama |
| 2006/0048648 A1 | 3/2006 | Gibbs et al. .................. 96/108 |
| 2006/0049102 A1 | 3/2006 | Miller et al. ............ 210/500.27 |
| 2006/0076270 A1 | 4/2006 | Poshusta et al. ............. 208/208 |
| 2006/0099096 A1 | 5/2006 | Shaffer et al. .............. 418/55.1 |
| 2006/0105158 A1 | 5/2006 | Fritz et al. .................. 428/317.9 |
| 2006/0162556 A1 | 7/2006 | Ackley et al. ................. 95/96 |
| 2006/0165574 A1 | 7/2006 | Sayari ......................... 423/210 |
| 2006/0169142 A1 | 8/2006 | Rode et al. .................. 96/129 |
| 2006/0236862 A1 | 10/2006 | Golden et al. ................ 95/96 |
| 2007/0084241 A1 | 4/2007 | Kretchmer et al. ........... 63/29.2 |
| 2007/0084344 A1 | 4/2007 | Moriya et al. ............... 95/210 |
| 2007/0222160 A1 | 9/2007 | Roberts-Haritonov et al. ............. 277/387 |
| 2007/0253872 A1 | 11/2007 | Keefer et al. ................ 422/143 |
| 2007/0261550 A1 | 11/2007 | Ota |
| 2007/0261557 A1 | 11/2007 | Gadkaree et al. ............. 96/121 |
| 2007/0283807 A1 | 12/2007 | Whitley ......................... 95/96 |
| 2008/0051279 A1 | 2/2008 | Klett et al. ..................... 502/60 |
| 2008/0072822 A1 | 3/2008 | White ......................... 118/722 |
| 2008/0128655 A1 | 6/2008 | Garg et al. ................... 252/373 |
| 2008/0282883 A1 | 11/2008 | Rarig et al. .................... 95/96 |
| 2008/0282884 A1 | 11/2008 | Kelley et al. ................... 95/96 |
| 2008/0282885 A1 | 11/2008 | Deckman et al. .............. 95/98 |
| 2008/0282886 A1 | 11/2008 | Reyes et al. .................... 95/98 |
| 2008/0282887 A1 | 11/2008 | Chance ......................... 95/96 |
| 2008/0282892 A1 | 11/2008 | Deckman et al. ............ 96/140 |
| 2008/0289497 A1 | 11/2008 | Barclay et al. ............... 95/114 |
| 2008/0307966 A1 | 12/2008 | Stinson ......................... 95/187 |
| 2008/0314550 A1 | 12/2008 | Greco ............................ 165/4 |
| 2009/0004073 A1 | 1/2009 | Gleize et al. ................ 422/180 |
| 2009/0014902 A1 | 1/2009 | Koivunen et al. ............. 265/11 |
| 2009/0025553 A1 | 1/2009 | Keefer et al. ................... 95/96 |
| 2009/0025555 A1 | 1/2009 | Lively et al. |
| 2009/0037550 A1 | 2/2009 | Mishra et al. ................ 708/208 |
| 2009/0071333 A1 | 3/2009 | LaBuda et al. ................ 95/96 |
| 2009/0079870 A1 | 3/2009 | Matsui ......................... 348/558 |
| 2009/0107332 A1 | 4/2009 | Wagner ........................ 95/100 |
| 2009/0151559 A1 | 6/2009 | Verma et al. .................. 95/96 |
| 2009/0162268 A1 | 6/2009 | Hufton et al. ................ 423/210 |
| 2009/0180423 A1 | 7/2009 | Kroener ...................... 370/328 |
| 2009/0241771 A1 | 10/2009 | Manning et al. ............... 95/15 |
| 2009/0284013 A1 | 11/2009 | Anand et al. .................. 290/52 |
| 2009/0294366 A1 | 12/2009 | Wright et al. |
| 2009/0308248 A1 | 12/2009 | Siskin et al. ................. 95/236 |
| 2009/0314159 A1 | 12/2009 | Haggerty ....................... 95/90 |
| 2010/0059701 A1 | 3/2010 | McLean ...................... 251/304 |
| 2010/0077920 A1 | 4/2010 | Baksh et al. ................... 95/97 |
| 2010/0089241 A1 | 4/2010 | Stoner et al. ................. 96/125 |
| 2010/0186445 A1 | 7/2010 | Minta et al. .................. 62/606 |
| 2010/0212493 A1 | 8/2010 | Rasmussen et al. ............. 95/45 |
| 2010/0251887 A1 | 10/2010 | Jain ................................ 95/46 |
| 2010/0252497 A1 | 10/2010 | Ellison et al. ............. 210/500.1 |
| 2010/0263534 A1 | 10/2010 | Chuang ........................ 95/139 |
| 2010/0282593 A1 | 11/2010 | Speirs et al. .................. 203/11 |
| 2010/0288704 A1 | 11/2010 | Amsden et al. .............. 210/688 |
| 2011/0031103 A1 | 2/2011 | Deckman et al. ............. 203/41 |
| 2011/0067440 A1 | 3/2011 | Van Aken .................... 62/613 |
| 2011/0067770 A1 | 3/2011 | Pederson et al. ........ 137/625.15 |
| 2011/0146494 A1 | 6/2011 | Desai et al. .................. 96/115 |
| 2011/0217218 A1 | 9/2011 | Gupta et al. ................. 423/228 |
| 2011/0277620 A1 | 11/2011 | Havran et al. ................ 89/1.14 |
| 2011/0291051 A1 | 12/2011 | Hershkowitz et al. ....... 252/373 |
| 2011/0296871 A1 | 12/2011 | Van Soest-Vercammen et al. ...... 62/636 |
| 2011/0308524 A1 | 12/2011 | Brey et al. ............... 128/205.12 |
| 2012/0024152 A1 | 2/2012 | Yamawaki et al. ............. 95/96 |
| 2012/0031144 A1 | 2/2012 | Northrop et al. .............. 62/617 |
| 2012/0067216 A1 | 3/2012 | Corma Canos et al. ......... 95/95 |
| 2012/0152115 A1 | 6/2012 | Gerds et al. .................... 95/90 |
| 2012/0222551 A1 | 9/2012 | Deckman ........................ 95/96 |
| 2012/0222552 A1 | 9/2012 | Ravikovitch et al. ........... 95/97 |
| 2012/0222553 A1 | 9/2012 | Kamakoti et al. .............. 95/99 |
| 2012/0222554 A1 | 9/2012 | Leta et al. ..................... 95/104 |
| 2012/0222555 A1 | 9/2012 | Gupta et al. .................. 95/136 |
| 2012/0255377 A1 | 10/2012 | Kamakoti et al. ......... 73/863.23 |
| 2012/0308456 A1 | 12/2012 | Leta et al. .................... 423/228 |
| 2012/0312163 A1 | 12/2012 | Leta et al. ...................... 95/97 |
| 2013/0061755 A1 | 3/2013 | Frederick et al. ............. 96/110 |
| 2013/0205828 A1* | 8/2013 | Sethna ................ B01D 53/047 62/607 |
| 2013/0225898 A1 | 8/2013 | Sundaram et al. ............ 585/802 |
| 2014/0013955 A1 | 1/2014 | Tammera et al. ............. 96/115 |
| 2014/0060326 A1 | 3/2014 | Sundaram et al. .............. 95/96 |
| 2014/0157986 A1 | 6/2014 | Ravikovitch et al. ........... 95/96 |
| 2014/0208797 A1 | 7/2014 | Kelley et al. .................. 62/611 |
| 2014/0216254 A1 | 8/2014 | Tammera et al. ............. 95/114 |
| 2015/0013377 A1 | 1/2015 | Oelfke |
| 2015/0068397 A1 | 3/2015 | Boulet et al. |
| 2015/0196870 A1 | 7/2015 | Albright et al. |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO2002/024309 | 3/2002 |
| WO | WO2002/073728 | 9/2002 |
| WO | WO2005/090793 | 9/2005 |
| WO | WO2011/139894 | 11/2011 |

OTHER PUBLICATIONS

ExxonMobil Research and Engineering and Xebec (2008) RCPSA-Rapid Cycle Pressure Swing Adsorption—An Advanced, Low-Cost Commercialized H2 Recovery Process, *Brochure*, 2 pages.

(56) References Cited

OTHER PUBLICATIONS

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
Farooq, S. et al. (1990) "Continuous Contercurrent Flow Model for a Bulk PSA Separation Process," *AIChE J.*, v36 (2) p. 310-314.
FlowServe (2005)"Exceeding Expectations, US Navy Cuts Maintenance Costs With Flowserve GX-200 Non-Contacting Seal Retrofits," *Face-to-Face*, v17.1, 8 pgs.
GE Oil & Gas (2007) "Dry Gas Seal Retrofit," Florene, Italy, www.ge.com/oilandgas. 4 pgs.
Hopper, B. et al. (2008) "World's First 10,000 psi Sour Gas Injection Compressor," *Proceedings of the $37^{th}$ Turbomachinery Symosium*, pp. 73-95.
Kikkinides, E. S. et al. (1995) "Natural Gas Desulfurization by Adsorption: Feasibility and Multiplicity of Cyclic Steady States," *Ind. Eng. Chem. Res*. V. 34, pp. 255-262.
Rameshni, Mahin (May 19, 2007) "Strategies for Sour Gas Field Developments," *Worley Parsons-Brochure*, 20 pgs.
Reyes, S. C. et al. (1997) "Frequency Modulation Methods for Diffusion and Adsorption Measurements in Porous Solids," *J. Phys. Chem. B*. v101, pp. 614-622.
Ruthven, D. M. et al. (1996) "Performance of a Parallel Passage Adsorbent Contactor," *Gas. Sep. Purif.*, vol. 10, No. 1, pp. 63-73.
Stahley, J. S. (2003) "Design, Operation, and Maintenance Considerations for Improved Dry Gas Seal Realiability in Centrifugal Compressors," *Dresser-Rand, Tech. Paper* 134, 15 pages.
Suzuki, M. (1985) "Continuous-Countercurrent-Flow Approximation for Dynamic Steady State Profile of Pressure Swing Adsorption"*AIChE Symp. Ser*. v81 (242) pp. 67-73.

\* cited by examiner

APPARATUS AND SYSTEM FOR SWING ADSORPTION PROCESSES RELATED THERETO

CROSS REFERENCE TO RELATED APPLICATIONS

This application claims the benefit of both U.S. Provisional Application No. 62/370,977 filed Aug. 4, 2016, entitled "Apparatus and System for Swing Adsorption Processes Related Thereto," and U.S. Provisional Application No. 62/213,267 filed Sep. 2, 2015, entitled "Apparatus and System for Swing Adsorption Process Related Thereto", the entireties of which are incorporated herein by reference.

Additionally, it is noted that this application is related to U.S. Provisional Application No. 62/213,262 filed Sep. 2, 2015, entitled "Apparatus and System for Swing Adsorption Processes Related Thereto;" U.S. Provisional Application No. 62/213,270 filed Sep. 2, 2015, entitled "Apparatus and System for Combined Temperature and Pressure Swing Adsorption Processes Related Thereto" and U.S. Provisional Application No. 62/213,273 filed Sep. 2, 2015 entitled "Apparatus and System for Swing Adsorption Processes Related Thereto."

FIELD

The present techniques relate to a system associated with an enhanced swing adsorption process. In particular, the system relates to a swing adsorption process for the dehydration of a feed stream utilizing adsorbent beds which may be integrated with recovery equipment.

BACKGROUND

Gas separation is useful in many industries and can typically be accomplished by flowing a mixture of gases over an adsorbent material that preferentially adsorbs one or more gas components, while not adsorbing one or more other gas components. The non-adsorbed components are recovered as a separate product.

One particular type of gas separation technology is swing adsorption, such as temperature swing adsorption (TSA), pressure swing adsorption (PSA), partial pressure purge swing adsorption (PPSA), rapid cycle pressure swing adsorption (RCPSA), rapid cycle partial pressure swing adsorption (RCPPSA), rapid cycle temperature swing adsorption (RCTSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated in a PSA process, for example, by reducing the pressure, thereby releasing the adsorbed carbon dioxide. The adsorbent material is then typically purged and repressurized. Then, the adsorbent material is ready for another adsorption cycle.

The swing adsorption processes typically involve one or more adsorbent bed units, which include adsorbent beds disposed within a housing configured to maintain fluids at various pressures for different steps in an adsorption cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids. Orchestrating these adsorbent bed units involves coordinating the cycles for each adsorbent bed unit with other adsorbent bed units in the system. A complete PSA cycle can vary from seconds to minutes as it transfers a plurality of gaseous streams through one or more of the adsorbent bed units.

While conventional glycol absorption processes for dehydration of feeds, such as natural gas, are established and low cost processes, glycol absorption does not provide the level of dehydration required for certain recovery processes, such as cryogenic processing of natural gas, for example, to recover natural gas liquids (NGLs). For example, the water content of glycol dehydrated natural gas is relatively low (e.g., between 100 parts per million molar (ppm) and 200 ppm) at typical field dehydration specifications, but has to be reduced to less than 1 ppm, or even less than 0.1 ppm, for cryogenic processing.

Conventional dehydration of natural gas streams for subsequent cryogenic processing is accomplished using a TSA molecular sieve adsorption process. In the TSA molecular sieve adsorption process, the natural gas flows through molecular sieve adsorbent beds that extract the water from the gas in the stream. Several adsorbent beds are arranged in parallel to provide one or more molecular sieve adsorbent beds performing the adsorption step (e.g., adsorbing water from the stream), while one or more of the other molecular sieve adsorbent beds are performing regeneration steps (e.g., offline for regeneration to remove adsorbed contaminants from the adsorbent bed). When the molecular sieve adsorbent bed is almost saturated, the molecular sieve adsorbent bed is placed into a regeneration step (e.g., taken offline) and a portion of the dry gas product stream is heated to about 500° F. (260° C.) in a fired heater and directed through the molecular sieve adsorbent bed to raise the temperature and desorb the water from the molecular sieve adsorbent bed. The wet regeneration gas (e.g., gas with the desorbed water from the bed) is then cooled outside the bed to condense out the water and the gas is recycled into the feed stream upstream of the dehydration system. Unfortunately, for typical NGL recovery plants, such as a cryogenic NGL recovery plants, the molecular sieve adsorbent beds require large high pressure vessels and involve large volumes of gas and adsorbent material. As the TSA molecular sieve adsorption process operates at feed stream pressure, the units involve high pressures, contain a large inventory of adsorbent material, are heavy, have a large footprint, and are costly to operate. Also, the duration of the thermal swing cycle is two or more hours as the adsorption front progresses through the majority of the molecular sieve adsorbent bed's length. The TSA molecular sieve adsorption process also requires a regeneration gas fired heater that uses significant amounts of fuel and requires a large footprint due to the safety spacing requirements for fired elements.

Conventionally, following its regenerating of the wet adsorbent beds, the wet regeneration gas is recycled to the feed stream upstream of the dehydration system or used as process plant fuel. To avoid excessive recycle, the volume of the dry gas that can be used for regeneration is limited to a small percentage of the feed stream volume, typically less than ten percent. With a relatively low volume of regeneration gas and the need to nearly completely dehydrate the adsorbent bed during regeneration, a high regeneration temperature of about 500° F. (260° C.) or more is needed to completely regenerate the molecular sieve adsorbent beds during each cycle. Even when the regeneration gas is limited to 500° F. (260° C.), the temperature of the regeneration gas can eventually cause hydrothermal degradation of the adsorbent particles and coke formation within the bed leading to deactivation, which is further increased with higher temperatures of the purge stream. Additionally, the use of a fired heater in a natural gas plant requires increased equipment spacing for risk mitigation, which is particularly costly in an offshore facility.

As another approach, a PSA molecular sieve adsorption process may be used for the process. This approach uses a low flow stream of purge gas at a low pressure to regenerate the molecular sieve adsorbent beds. Unfortunately, this process includes recycle compression for typical natural gas dehydration applications. As obtaining high regeneration gas temperatures is less costly than recycle compression, the PSA molecular sieve adsorption process is more costly than the TSA molecular sieve adsorption process noted above.

Accordingly, there remains a need in the industry for apparatus, methods, and systems that provide enhancements to the processing of feed streams with adsorbent beds, which may be integrated with recovery equipment. The present techniques provide enhancements by utilizing RCTSA processes to regenerate adsorbent beds at lower temperatures than those utilized in conventional molecular sieve TSA and at higher pressures than those utilized in PSA approaches. The present techniques overcomes the drawbacks of conventional molecular sieve TSA and PSA approaches by using larger purge gas volumes (e.g., ten to twenty times greater than in conventional molecular sieve TSA and PSA approaches). Further, a need remains for an approach that does not involve the use of purge gases heated to higher temperatures (e.g., at above 500° F. (260° C.)) or the use of fired heaters.

SUMMARY OF THE INVENTION

In one embodiment, a cyclical swing adsorption process for removing contaminants from a gaseous feed stream is described. The process comprises: a) performing one or more adsorption steps, wherein each of the adsorption steps comprises passing a gaseous feed stream at a feed pressure and feed temperature through an adsorbent bed unit to remove one or more contaminants from the gaseous feed stream and to form a product stream that is passed to a cryogenic recovery system including a demethanizer; b) performing one or more purge steps, wherein each of the purge steps comprises passing a purge stream through the adsorbent bed unit in a counter flow direction relative to the flow of the gaseous feed stream to form a purge product stream, wherein the purge stream comprises at least a portion of a demethanizer overhead stream from the demethanizer, wherein the purge pressure is in the range between 40% equal to or less than the feed pressure and 40% equal to or greater than the feed pressure; and c) repeating the steps a) to b) for at least one additional cycle.

In another embodiment, a system for removing contaminants from a gaseous feed stream is described. The system includes one or more adsorbent bed units and a cryogenic recovery system. Each of the one or more adsorbent bed units is configured to separate contaminants from a gaseous feed stream and to output a product stream, wherein the gaseous feed stream is provided at a feed temperature and a feed pressure. The cryogenic recovery system is configured to receive the product stream and to pass at least portion of the product stream to a demethanizer to separate the at least a portion of the product stream into a final product stream and a demethanizer overhead stream. Further, the system is configured with one or more conduits to pass a purge stream through the each of the one or more adsorbent bed units and wherein the purge stream comprises at least portion of the demethanizer overhead stream and the purge pressure is in the range between 40% equal to or less than the feed pressure and 40% equal to or greater than the feed pressure.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
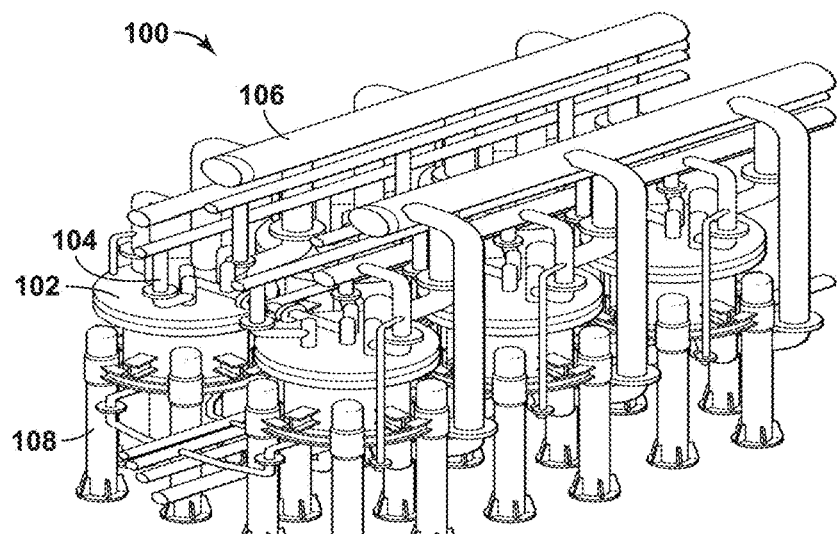
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, volume percent is based on standard conditions. The standard conditions for a method may be normalized to the temperature of 0° C. (e.g., 32° F.) and absolute pressure of 100 kiloPascals (kPa) (1 bar).

As used herein, "conduit" refers to a tubular member forming a channel through which fluids or the other materials are conveyed. The conduit may include one or more of a pipe, a manifold, a tube or the like.

The present techniques relate to a swing adsorption process (e.g., a rapid cycle process) for the deep dehydration of a feed stream (e.g., natural gas) utilizing rapidly cycled adsorbent beds. The present techniques integrate rapid cycle temperature swing adsorption (RCTSA) process for dehydration of a feed stream (e.g., a natural gas stream) with downstream recovery equipment (e.g., a cryogenic Natural Gas Liquid (NGL) recovery process). The residue gas from the downstream recovery equipment, such as a demethanizer overhead stream from a NGL recovery process, is used in the dehydration process as a purge gas to regenerate the adsorbent bed. The purge stream may be used to recover water from the adsorbent bed and may be configured to mix with residue sales gas (e.g., demethanizer overhead stream). Beneficially, in such a configuration, no regeneration gas has to be recycled to upstream of the dehydration process or used as fuel.

In contrast to conventional approaches, the present techniques utilize RCTSA to dehydrate the adsorbent bed. As a result, the purge gas is not generated by other means, such as gas furnaces and the like. The purge stream may be utilized to provide cost and safety benefits, along with operational enhancements. For example, the purge stream may lessen hydrothermal degradation of the adsorbent and lessen coke formation. Further, the present techniques may be less expensive compared to conventional TSA molecular sieve systems and have a smaller footprint by using adsorbent beds rather than conventional TSA molecular sieve dehydration.

As a further enhancement, the present techniques uses rapid cycle temperature swing adsorption (RCTSA) process for dehydration of a natural gas stream upstream of a cryogenic natural gas liquid (NGL) recovery process. In this configuration, warm residue gas from the discharge of the residue gas compressor is used as a purge stream to regenerate the adsorbent bed and remove the adsorbed water. Sales gas specifications may dictate the amount of allowable water in the feed gas stream, which may result in a TEG dehydration system upstream of the rapid cycle TSA dehydration process.

The concept may be extended to other contaminants such as $CO_2$ and other processes such as Controlled Freeze Zone™ (CFZ™). By way of example, the present techniques may integrate a swing adsorption process (e.g., RCTSA process) for removal of moisture to cryogenic specifications or low levels of $CO_2$ from natural gas with a cryogenic NGL plant configured for ethane recovery or a CFZ™ plant, where the demethanizer column overhead stream is used as purge gas to regenerate the adsorbent while returning the removed contaminants to the sales gas. The swing adsorption process (e.g., RCTSA process) may be integrated for the removal of heavy hydrocarbons from natural gas with a Controlled Freeze Zone™ (CFZ) process for bulk $CO_2$ removal from natural gas. In this configuration, the sweet gas stream from the CFZ™ process is used as purge gas to regenerate the adsorbent material in the adsorbent bed units, while desorbing the heavy hydrocarbons into the sales gas to increase its heating value or provide the heavy hydrocarbons for subsequent heavy hydrocarbon recovery. As yet another example, the configuration may involve integration of a cyclic gas treating process for removal a first component from a gas stream, where the first component may hinder or interfere with a second process for the removal of other components from the remaining gas stream. Further, at least a portion or all of the residue gas remaining after removal of the other components in the second process is returned to the first process to recover the first components into the residue gas stream and where no additional stream has to be recycled from the first process to the feed stream or to fuel.

In addition, the present techniques involve configurations where the regenerated gas in not recycled to the feed stream or fuel gas to overcomes the drawbacks of conventional approaches, such a conventional TSA and conventional PSA, by permitting the use of much larger purge gas volumes (e.g., ten time greater, twenty times greater or more than in conventional TSA and conventional PSA. That is, the present techniques use rapid cycle swing adsorption (e.g., RCTSA) to regenerate the adsorbent beds at moderate temperatures and pressures and lower cost.

As one enhancement, the present techniques provide the purge output stream or purge product stream from the adsorbent bed from the purge step to pipeline sales gas after passing through the adsorbent bed unit. The purge output stream is provided to pipeline sales gas because the pipeline sales gas product specifications are typically less stringent than cryogenic processing feed gas specifications. Thus, water that has been removed for subsequent downstream processing (e.g., cryogenic processing to remove a portion of the hydrocarbons heavier than methane) may be returned to the natural gas sales gas stream, which is referred to as sales gas, after the recovery (e.g., NGL recovery) without adverse effects. The configuration uses substantially all or the entire residue gas stream from the NGL plant as purge gas for the purge gas stream, which may be the demethanizer overhead stream. As a result, the heating or pressure reduction and recompression of the purge stream (e.g., regeneration gas) may not be required. Further, by lessening the temperature of the adsorbent bed heating during the regeneration step or desorption step, the reliance on the fired heater is eliminated for steady state or normal operations, which reduces capital investment and process footprint. Also, the configuration lessens coke formation within the adsorbent beds and hydrothermal degradation of the adsorbent materials that challenge conventional TSA molecular sieve adsorption processes.

Also, the present techniques may also include various pressures for the feed stream and the purge stream. For example, the feed pressure may be based on the preferred adsorption feed pressure, which may be in the range from 400 pounds per square inch absolute (psia) to 1,400 psia, or in the range from 600 psia to 1,200 psia. Also, the purge pressure may be based on the sales pipeline pressure, which may be in the range from 400 psia to 1400 psia, in the range from 600 psia to 1200 psia. By way of example, the purge pressure may be in the range between 40% equal to or less than the feed pressure and 40% equal to or greater than the feed pressure, in the range between 20% equal to or less than the feed pressure and 20% equal to or greater than the feed pressure, in the range between the feed pressure and 40% equal to or greater than the feed pressure, or in the range between the feed pressure and 20% equal to or greater than the feed pressure. In addition, the pressure of the purge output stream or purge product stream may be within a range of 10% of a sales gas pressure of a sales gas stream; within a range of 5% of a sales gas pressure of a sales gas stream; within a range of 2.5% of a sales gas pressure of a sales gas stream.

As another enhancement, the present techniques may provide dehydration through the use of a rapid cycle swing adsorption process, such as a rapid cycle TSA process. While the swing capacity per weight of the adsorbent bed may be less than conventional TSA molecular sieve dehydration, without the requirement for complete drying of the adsorbent bed (e.g., making the quantity of adsorbent required larger), the use of rapid cycles lessens the adsorbent quantity as compared to conventional TSA molecular sieve dehydration in that the required adsorbent quantity is ten to more than one hundred times smaller than conventional TSA molecular sieve dehydration. Also, it may not be required that the purge stream used on the adsorbent bed completely dries the feed end of the adsorbent bed.

In the present techniques, the product end of the adsorbent bed is maintained nearly dry (e.g., the water loading for the region near the product end is less than 1 mole per kilogram (mol/kg), is less than 0.5 mol/kg, or is less than 0.1 mol/kg), but is it is not essential to fully dry the feed end of the adsorbent bed. The feed end or feed side is the end of the adsorbent bed that the feed stream initially enters, while the product end is the end of the adsorbent bed opposite from the feed end and where the feed stream exits the adsorbent bed. The loading level of water may be lower on the feed side of the adsorbent bed during the purge step, but the length of adsorbent bed that contains water may be reduced during the purge step. For example, an adsorbate loaded region may be a specific portion of the adsorbent bed from the feed end of the adsorbent bed to 10% of the bed length, from the feed end of the adsorbent bed to 40% of the bed length or from the feed end of the adsorbent bed to 75% of the bed length. Utilizing only a portion of the bed length ensures that the product end of the bed remains rigorously dry and enables extremely low product water concentrations. Further, maintaining a significant portion of the product end of the bed dry provides flexibility for non-uniformity of gas passage channels in embodiments where a structured adsorbent, such as a monolith, is used for the adsorbent bed or adsorber structure. The product region may be a specific portion of the adsorbent bed from the product end of the adsorbent bed to 10% of the bed length, from the product end of the adsorbent bed to 25% of the bed length or from the product end of the adsorbent bed to 40% of the bed length. The difference between the total adsorbent bed water loading during the purge step and during the adsorption step is the basis of the swing capacity of the process.

In one or more embodiments, the flow rate of the purge stream may be associated with the flow rate of the demethanizer overhead stream. The purge stream comprises at least 20 volume % of the demethanizer overhead stream, at least 50 volume % of the demethanizer overhead stream, at least 80 volume % of the demethanizer overhead stream or at least 95 volume % of the demethanizer overhead stream. In certain embodiments, the purge stream flow rate may be substantially the same as the flow rate of the demethanizer overhead flow rate (e.g., about 100 volume %).

Further, in other embodiments, the purge stream is provided at a temperature equal to or greater than the temperature of the feed stream. The purge stream temperature may be within a range between 70° F. and 450° F., within a range between 70° F. and 300° F. or within a range between 90° F. and 175° F.

Also, the present techniques may be integrated into a various configurations. For example, the present techniques may be utilized, but not limited to, dehydration prior to and integrated with a cryogenic Natural Gas Liquid (NGL) recovery system, which may involve removing contaminants to cryogenic processing feed gas specifications. Other embodiments may include configurations that involve integration with a Controlled Freeze Zone™ (CFZ™) process. For example, the configuration may use the adsorbent bed units to remove heavy hydrocarbons from CFZ™ process, and then use the $CO_2$ and $H_2S$ clean CFZ™ product to purge the heavy hydrocarbons off the adsorbent beds in the adsorbent bed units. Further still, other integrations may include liquefied natural gas (LNG) plant, or other such plants. Regardless, the present techniques may be used to treat feed streams containing excessive amounts of water and $CO_2$. The present techniques may also be used to remove contaminants to other specifications, such as cryogenic natural gas liquefaction specifications for a cryogenic natural gas liquefaction recovery plant.

In one or more embodiments, a cyclical swing adsorption process for removing contaminants from a gaseous feed stream is described. The process comprises: a) performing one or more adsorption steps, wherein each of the adsorption steps comprises passing a gaseous feed stream at a feed pressure and feed temperature through an adsorbent bed unit to remove one or more contaminants from the gaseous feed stream and to form a product stream that is passed to a cryogenic recovery system including a demethanizer; b) performing one or more purge steps, wherein each of the purge steps comprises passing a purge stream through the adsorbent bed unit in a counter flow direction relative to the flow of the gaseous feed stream to form a purge product stream, wherein the purge stream comprises at least a portion of a demethanizer overhead stream from the demethanizer, wherein the purge pressure is in the range between 40% equal to or less than the feed pressure and 40% equal to or greater than the feed pressure; and c) repeating the steps a) to b) for at least one additional cycle.

In certain configurations, one or more enhancements may be utilized in the process. For example, the cyclical swing adsorption process may include the purge stream comprising at least 20 volume % of the demethanizer overhead stream, at least 50 volume % of the demethanizer overhead stream, or at least 95 volume % of the demethanizer overhead stream; passing the purge product stream to sales gas, wherein the pressure of the purge output stream is within a range of 5% of a sales gas pressure of a sales gas stream; wherein the purge pressure is in the range between 20% equal to or less than the feed pressure and 20% equal to or greater than the feed pressure, in the range between the feed pressure and 40% equal to or greater than the feed pressure, or in the range between the feed pressure and 20% equal to or greater than the feed pressure; performing one or more blowdown steps after step (b) and before step (c), wherein each of the blowdown steps comprises passing a blowdown outlet stream from the adsorbent bed unit to be mixed with the feed stream and/or sales gas stream, wherein the one or more blowdown steps reduce the pressure within the adsorbent bed unit by a predetermined amount to the feed pressure; wherein the purge stream is at a purge temperature within a range between 70° F. and 450° F. or within a range between 70° F. and 300° F.; and/or wherein the cycle duration is greater than 1 second and less than 1200 seconds or greater than 2 seconds and less than 600 seconds. Further, the cyclical swing adsorption process may include wherein the gaseous feed stream is a hydrocarbon containing stream having greater than one volume percent hydrocarbons based on the total volume of the feed stream; wherein the gaseous feed stream comprises hydrocarbons and $H_2O$, wherein the $H_2O$ is one of the one or more contaminants and the gaseous feed stream comprises $H_2O$ in the range of two parts per million molar to saturation levels in the gaseous feed stream or in the range of 50 parts per million molar to 1,500 parts per million molar; wherein the gaseous feed stream comprises hydrocarbons and $CO_2$, wherein the $CO_2$ is one of the one or more contaminants and the gaseous feed stream comprises $CO_2$ in the range between 0 molar percent and 5 molar percent of the total volume of the gaseous feed stream or is less than the quantity of one minus the molar fraction of heavy hydrocarbons in the gaseous feed stream times the sales gas $CO_2$ maximum concentration specification; wherein the feed pressure is in the range between 400 pounds per square inch absolute (psia) and 1,400 psia; wherein water content in the product stream is in the range between 0.0 ppm and 5.0 ppm; wherein the cryogenic recovery system is a cryogenic natural gas liquids recovery system; wherein the cryogenic recovery system is a cryogenic Controlled Freeze Zone™ recovery system and/or wherein the adsorbent bed unit comprises an adsorbent material of Zeolite 3A, Zeolite 4A or Zeolite 5A.

In one or more other configurations, a system for removing contaminants from a gaseous feed stream is described. The system includes one or more adsorbent bed units and a cryogenic recovery system. Each of the one or more adsorbent bed units is configured to separate contaminants from a gaseous feed stream and to output a product stream, wherein the gaseous feed stream is provided at a feed temperature and a feed pressure. The cryogenic recovery system is configured to receive the product stream and to pass at least portion of the product stream to a demethanizer to separate the at least a portion of the product stream into a final product stream and a demethanizer overhead stream. Further, the system is configured with one or more conduits to pass a purge stream through the each of the one or more adsorbent bed units and wherein the purge stream comprises at least portion of the demethanizer overhead stream and the purge pressure is in the range between 40% equal to or less than the feed pressure and 40% equal to or greater than the feed pressure.

In certain configurations, the system may include other equipment or the cryogenic recovery system is a cryogenic natural gas liquids recovery system or a cryogenic Controlled Freeze Zone™ recovery system. For example, the system may include a glycol contactor unit configured to receive an input stream and to remove at least a portion of the water from the input stream, and a filter unit configured to receive the glycol output stream from the glycol contactor unit and to conduct away particulates and liquid droplets and to provide the feed stream to the one or more adsorbent bed units, wherein the gaseous feed stream is below saturation levels; one or more conduits pass a purge product stream from the one or more adsorbent bed units to a storage unit as a sales gas stream, wherein the pressure of the purge product stream is within a range of 5% of a sales gas pressure of a sales gas stream; a gas/gas exchanger unit configured to receive the product stream from the adsorbent bed unit and to lower the temperature of the product stream by heat exchange with the at least portion of the demethanizer overhead stream; a subcooler unit configured to receive a portion of the exchanger output stream from the gas/gas exchanger unit and to adjust the temperature of the portion of the exchanger output stream to the desired temperature for the demethanizer by heat exchange with the at least portion of the demethanizer overhead stream; and/or a compressor configured to: receive the demethanizer overhead stream from the gas/gas exchanger unit; increase the pressure of the demethanizer overhead stream into a compressed demethanizer overhead stream; and provide the compressed demethanizer overhead stream to a regeneration adsorbent bed unit as the purge stream.

Beneficially, the present techniques provide a modular design and may be configured to lessen the footprint, weight, and capital expense of processes to perform dehydration of feed streams (e.g., predominately natural gas streams) utilizing rapidly cycled adsorbent beds. Also, as this process does not involve the use any fired heater (e.g. fired furnaces for normal operations), the present techniques may eliminate the use of fired heaters or high temperature heat exchanger from the process. The removal of such equipment is inherently safer due to the elimination of the flames along with the associated equipment and may lower fuel consumption and greenhouse gas (GHG) emissions due to lack of combustion in a furnace. Further, the present techniques may increase flexibility regarding the selection of adsorbent material used in the process, may lessen hydrothermal degradation of the adsorbent, may reduce dust formation due to monolithic adsorbent bed design, may lessen solid waste production due to lower adsorbent quantities and/or may lessen adsorption of heavy hydrocarbons (e.g., $C_{2+}$) by appropriate selection of adsorbent materials (e.g., low adsorbent quantities. The present techniques may also lower impact on downstream process equipment when switching adsorbent beds, but utilizing spare units to provide a mechanism for some of the adsorbent bed units to be removed from service for adsorbent bed reconditioning or other similar processes, while continuing to supply the downstream processes with a steady flow of dry or cleaned feed stream.

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle temperature swing adsorption (RCTSA), rapid cycle partial pressure swing adsorption (RCPPSA), as well as combinations of these processes, such as pressure and/or temperature swing adsorption. Exemplary kinetic swing adsorption processes are described in U.S. Patent Application Publication Nos. 2008/0282892, 2008/0282887, 2008/

0282886, 2008/0282885, 2008/0282884 and 2014/0013955, which are each herein incorporated by reference in their entirety.

Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants and heavy hydrocarbons (e.g., hydrocarbons having at least two carbon atoms). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

In certain embodiments, the present techniques may be used to remove contaminants from feed streams, such as acid gas from hydrocarbon streams. Acid gas removal technology may be useful for gas reserves exhibit higher concentrations of acid gas (e.g., sour gas resources). Hydrocarbon feed streams vary widely in amount of acid gas, such as from several parts per million acid gas to 90 volume percent (vol. %) acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. Accordingly, the present techniques may include equipment to remove various contaminants, such as $H_2S$ and $CO_2$ to desired levels. In particular, the $H_2S$ may be lowered to levels less than 4 ppm, while the $CO_2$ may be lowered to levels less than 1.8 molar percent (%) or, preferably, less than 50 ppm.

In certain embodiments, the gaseous feed stream may predominately comprise hydrocarbons alone with one or more contaminants. For example, the gaseous feed stream may be a hydrocarbon containing stream having greater than one volume percent hydrocarbons based on the total volume of the feed stream. Further, the gaseous feed stream may include hydrocarbons and $H_2O$, wherein the $H_2O$ is one of the one or more contaminants and the gaseous feed stream comprises $H_2O$ in the range of 50 parts per million (ppm) molar to 1,500 ppm molar; or in the range of 500 ppm to 1,500 ppm molar. Moreover, the gaseous feed stream may include hydrocarbons and $H_2O$, wherein the $H_2O$ is one of the one or more contaminants and the gaseous feed stream comprises $H_2O$ in the range of two ppm molar to saturation levels in the gaseous feed stream. In addition, the gaseous feed stream comprises hydrocarbons and $CO_2$, wherein the $CO_2$ is one of the one or more contaminants and the gaseous feed stream comprises $CO_2$ in the range between 0 molar percent and 5 molar percent of the total volume of the gaseous feed stream or the range between 0 molar percent and 2 molar percent of the total volume of the gaseous feed stream.

In other embodiments, the present techniques may be used to lessen the water content of the stream to a specific level by the swing adsorption process. The specific level may be related to dew point of desired output product (e.g., the water content should be lower than the water content required to obtain a dew point below the lowest temperature of the stream in subsequent process and is related to the feed pressure. As a first approximation, and not accounting for fugacity corrections as a function of pressure, the water concentration in ppm that yields a certain dew point varies inversely with the pressure. For example, the output stream from the adsorbent bed may be configured to be the cryogenic processing feed stream, which satisfies the cryogenic processing specifications (e.g., approximately $-150°$ F. ($-101.1°$ C.) dew point for NGL processes or approximately $-60°$ F. ($-51.1°$ C.) for Controlled Freeze Zone™ (CFZ™) processes. The cryogenic processing feed stream specification may include a water content in the stream (e.g., output stream from the adsorbent bed or feed stream to the to be cryogenic processing) to be in the range between 0.0 ppm and 10 ppm, in the range between 0.0 ppm and 5.0 ppm, in the range between 0.0 ppm and 2.0 ppm, or in the range between 0.0 ppm and 1.0 ppm. The resulting output stream from the adsorbent beds during the purge step may include a water content in the stream to be in the range between 0.0 ppm and 7 pounds per standard cubic feet (lb/MSCF).

In one or more embodiment, the present techniques may be used as an integration of a rapid cycle TSA process for removal of contaminants from a feed stream (e.g., natural gas stream) with a downstream cryogenic NGL recovery process. For example, the configuration may include an integration of TSA in the adsorption process to remove low levels of $CO_2$ from natural gas (about 2% by volume $CO_2$) with a cryogenic NGL plant configured for ethane recovery. The $CO_2$ removal may be limited to less than the natural gas sales gas specifications. In particular, as the gaseous feed stream may include hydrocarbons and one or more contaminants, such as $CO_2$, the $CO_2$ in the gaseous feed stream may be less than the quantity of one minus the molar fraction of heavy hydrocarbons in the gaseous feed stream times the sales gas $CO_2$ maximum concentration specification. By way of example, if the natural gas sales gas specification is $CO_2$ content of 2 molar % or less, and the process removes 10 molar % heavy hydrocarbons in the NGL plant, then the purge stream may be 10 molar % less than the original feed, which results in a maximum $CO_2$ content in the original feed being less than 1.8 molar % $CO_2$ so the resulting purge stream is less than 2.0 molar % $CO_2$ content. In the cryogenic NGL plant, the demethanizer column overhead stream may be used as the purge gas to regenerate the adsorbent beds, while returning the low levels of $CO_2$ to the sales gas. Further, in another example, the configuration may include an integration of TSA for removal of heavy hydrocarbons from a natural gas with the Controlled Freeze Zone™ (CFZ) process for bulk $CO_2$ removal from natural gas. See, e.g., U.S. Patent Application Nos. 2009/0266107 and 2010/0018248. In this configuration, the sweet gas (e.g., stream having $H_2S$ and $CO_2$ removed or below desired levels) from the CFZ™ process may be used as the purge gas to regenerate the adsorbent beds, while desorbing the heavy hydrocarbons into the sales gas stream to increase its heating value or provide a mechanism for subsequent heavy hydrocarbon recovery. As yet another example, the configuration may include an integration of a cyclic gas treating process for removal of a first component from a gas stream, where the first component may interfere with a subsequent process (e.g., a second process for the removal of other components from the gas stream). In this configuration, a substantial portion or the entire the residue gas stream remaining after removal of the other components in the second process is then returned to the first process to recover the first components into the residue gas stream. Also, no other stream may be recycled from the first process to the feed stream or to fuel.

Further, other configurations may include bypassing at least a portion of the gaseous feed stream around the swing adsorption process. In such configurations, a larger amount of contaminants may be processed in the system. For example, if a higher $CO_2$ content stream has to be processed as the gaseous feed stream, then a bypass configuration may be utilized to divert at least a portion of the gaseous feed stream around the swing adsorption process (e.g., adsorbent bed units) and recombine the bypass stream with the product stream from the swing adsorption process downstream of the swing adsorption process and upstream of the demethanizer. In this configuration, excess $CO_2$ goes with the NGLs and the demethanizer overhead is still within the pipeline specification for $CO_2$.

In yet another embodiment, the present techniques may not recycle the regeneration gas to the feed stream or fuel gas. This configuration overcomes the drawbacks of conventional TSA molecular sieve adsorption process and PSA molecular sieve adsorption process by permitting the use of much larger purge gas volumes. For example, the purge gas volume may be five to twenty times greater than in conventional TSA molecular sieve adsorption process and PSA molecular sieve adsorption process. Accordingly, the rapid cycle TSA may be used to regenerate the adsorbent beds at moderate temperatures, as noted above, and pressures and lower cost.

Further, in one or more embodiments, the present techniques may include a specific process flow to remove contaminants, such as water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, a purge step and one or more re-pressurization steps. The depressurization steps may include reducing the pressure of the adsorbent bed unit by a predetermined amount for each successive depressurization step, which may be a single step and/or may be a blowdown step. The depressurization step may be provided in a forward direction or may preferably be provided in a countercurrent direction (e.g., from the product end of the adsorbent bed to the feed end of the adsorbent bed). The purge step may include passing a purge stream into the adsorbent bed unit, which may be a once through purge step and the purge stream may be provided in countercurrent flow relative to the feed stream. The output stream from the purge step may be conducted away for fuel in other equipment, such as the NGL plant, CFZ plant and/or LNG plant, and/or may be mixed with the sales gas stream. The one or more re-pressurization steps may be performed, wherein the pressure within the adsorbent bed unit is increased with each re-pressurization step by a predetermined amount with each successive re-pressurization step. Then, the cycle may be repeated for additional streams. The sequence of operation of a cycle may be adsorption step, one or more depressurization steps, purge step, and one or more re-pressurization step. The sequence of operation of cycle may also be adsorption step, one or more re-pressurization steps, a purge step, and one or more de-pressurization steps. The cycle duration may be for a period greater than 1 second and less than 1200 seconds, greater than 2 second and less than 600 seconds, for a period greater than 2 seconds and less than 300 seconds, for a period greater than 2 seconds and less than 200 seconds, or for a period greater than 2 seconds and less than 90 seconds. The present techniques may be further understood with reference to the FIGS. 1 to 8 below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
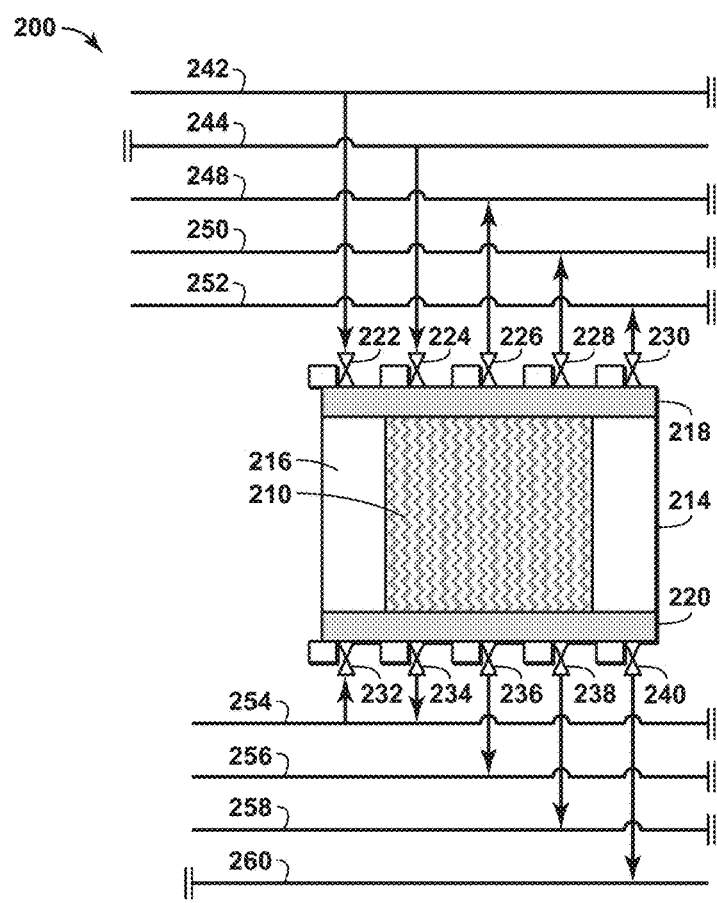
FIG. 2 is a diagram of a portion of an adsorbent bed unit having associated valve assemblies and manifolds in accordance with an embodiment of the present techniques.

FIG. 2 is a diagram 200 of a portion of an adsorbent bed unit having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure between 0 bara (bar absolute) or 0.1 bara and 100 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets. Further, while this configuration has valve assemblies 222 to 240, the number and operation of the valves may vary (e.g., the number of valves) based on the specific cycle being performed.

In swing adsorption processes, the cycle involves two or more steps that each has a certain time interval, which are summed together to be the cycle time. These steps include the regeneration step of the adsorbent bed following the adsorption step or feed step using a variety of methods including pressure swing, vacuum swing, temperature swing, purging (via any suitable type of purge fluid for the process), and combinations thereof. As an example, a swing adsorption cycle may include the steps of adsorption, depressurization, purging, and re-pressurization. When performing the separation at high pressure, depressurization and re-pressurization (which may be referred to as equalization steps) are performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

As noted above, conventional systems for dehydration is typically accomplished using TSA molecular sieve adsorption processes and PSA molecular sieve adsorption processes. The conventional systems involve many hours of operation for the molecular sieve unit to both fill with adsorbed species (e.g., water) and to heat for desorption. As a result, the molecular sieve units are very large (e.g., are a large footprint and involve more adsorbent than the present techniques). To minimize the regeneration gas volume required and to maximize bed capacity, the adsorbent beds of the molecular sieve unit is typically dried completely (e.g., below the desired product water activity level), which utilizes a purge gas at or above about 500° F. (260° C.). In addition, the conventional approaches maintain a narrow mass transfer zone, or sharp adsorption front to maximize bed utilization, while maintaining rigorous dehydration. A schematic diagram 300 of a conventional molecular sieve adsorption system 302 integrated into a cryogenic NGL recovery system 304 is shown below in FIG. 3.

Figure 3:
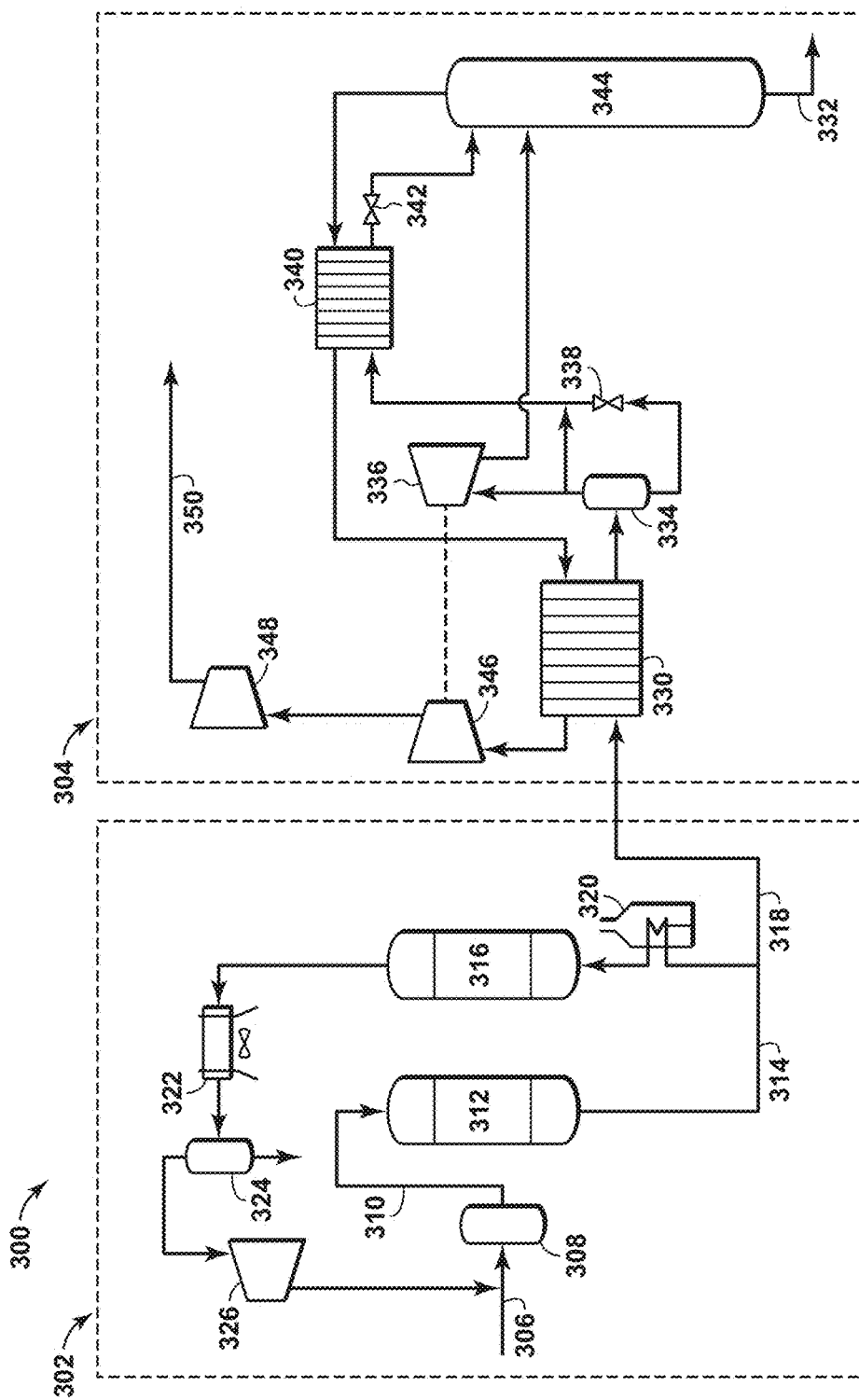
FIG. 3 is a diagram of a conventional molecular sieve adsorption system for dehydration of a feed stream to form a cryogenic NGL recovery stream.

As an example, FIG. 3 is a diagram 300 of a conventional molecular sieve adsorption system 302 for dehydration of a feed stream to form a cryogenic NGL recovery stream for a cryogenic NGL recovery system 304. As shown in the diagram 300, various equipment, such as units 308, 312, 316, 320, 322, 324 and 326 in the conventional molecular sieve adsorption system 302 and units 330, 334, 336, 340, 344, 346 and 348 in cryogenic NGL recovery system 304. The systems 302 and 304 are utilized to process an input stream in conduit 306 to produce an output stream, such as a cryogenic NGL stream in conduit 332. The cryogenic NGL stream may be provided with approximately 70 molar % of the $C_2$ and 100 molar % $C_{3+}$ contained in the original feed stream to the NGL process.

For the conventional molecular sieve adsorption system 302, the units are utilized to perform an adsorption step and a regeneration step in processing the input stream into the cryogenic NGL feed stream. The process begins with an input stream passing through conduit 306 to various units 308 and 312 during an adsorption step. The input stream passes initially into a filter 308, which is configured to remove at least a portion of particulates and liquid droplets from the input stream. The output stream from the filter 308 is the feed stream, which is provided via conduit 310 to a first molecular sieve unit 312. The first molecular sieve unit 312 is configure to separate additional contaminants, such as water from the stream. The dehydrated output from the first molecular sieve unit 312 is conveyed away from the first molecular sieve unit 312 in conduit 314. A portion of the stream in conduit 314 may be separated and utilized as a regeneration stream for a second molecular sieve unit 316 in a regeneration step. This regeneration stream may be a slip stream from the output stream from the first molecular sieve unit 312 during the adsorption step. The remaining portion of the output stream from the first molecular sieve unit 312 is provided to the cryogenic NGL recovery system 304 via conduit 318 as the cryogenic NGL feed stream.

For the regeneration step, the regeneration stream is passed to a fired heater unit 320, which is configured to adjust the temperature of the regeneration stream before being passed to the second molecular sieve unit 316. Then, the resulting molecular sieve regeneration stream is passed from the second molecular sieve unit 316 to a condenser 322. The condenser 322 is configured to decrease the temperature of the stream to form a liquid phase in the stream. From the condenser 322, the stream is passed to a separation unit 324, which is configured to separate the liquid phase from the vapor phase of the stream. The vapor phase is passed as a recycle stream to a recycle compressor 326, while the liquid phase is conducted away from the process. The recycle compressor 326 compresses the recycle stream from the separation unit 324 to the pressure of the input stream. The compressed recycle stream is then mixed with the input stream and provided to a molecular sieve unit performing the adsorption step in the process, such as first molecular sieve unit 312.

For the cryogenic NGL recovery system 304, the cryogenic NGL feed stream is provided from the conventional molecular sieve adsorption system 302 via conduit 318. In the cryogenic NGL recovery system 304, the units are utilized to process the cryogenic NGL feed stream and generate a cryogenic NGL output stream conducted away from the system 304 in conduit 332. The process begins by passing the cryogenic NGL feed stream (e.g., product steam from the absorbent bed unit 410) into a gas/gas exchanger unit 330 that lowers the temperature (e.g., cools) of the inlet stream by gas-gas temperature exchange with the residual gas (e.g., demethanizer overhead stream) exiting the NGL process. Then, the stream from the gas/gas exchanger unit 330 is provided to a cold separation unit 334, which separates the stream into a first stream (e.g., a first stream containing the methane and lighter heavy hydrocarbons) and a second stream (e.g., a second stream containing the heaviest of the hydrocarbons). From the cold separation unit 334, the first stream is conducted toward a turboexpander unit 336, which is configured to expand the stream to lessen the temperature of the stream, and then the stream is passed to the demethanizer 344. A slip stream may be separated from the first stream upstream of the turboexpander unit 336, which is mixed with the second stream upstream of the subcooler unit 340. The second stream is passed from the cold separation unit 334 through a throttle valve 338 via conduit 428 to control mixing ratios and combined with the slip stream from the first stream. The combined stream is passed to the subcooler unit 340 that adjusts the temperature of the stream to the desired temperature for the demethanizer tower. From the subcooler unit 340, the stream is passed through a throttle valve 342 that controls the feed rate to the demethanizer 344. The demethanizer 344 is utilized to separate the stream into the cryogenic NGL output stream conducted away from the system 304 in conduit 332 and an overhead stream (e.g., demethanizer overhead stream). The overhead stream is passed to the subcooler unit 340. Then, from the subcooler unit 340, the stream is passed to the gas/gas exchanger unit 330. From the gas/gas exchanger unit 330 the stream is passed to the compressor 346. The compressor 346 compresses the stream and passes the compressed stream passes the compressed stream to the boost compressor 348. The boost compressor 348 further increases the pressure of the stream into a boost output stream that is conducted away from the process via conduit 350. The boost output stream may be used for sales gas or utilized in other processes.

In this configuration, cryogenic temperatures in the demethanizer 344 by near-isentropic expansion in a turboexpander unit 336. The work of expansion in the turboexpander unit 336 drives a compressor 346 to partially recompress the lean residue gas from the gas/gas exchanger unit 330. The boost compressor 348 is utilized to boost the stream (e.g., residue gas from the compressor 346) to sales pipeline export pressure.

As an example, the input stream may be provided at a flow rate of 200 million standard cubic feet per day (MSCFD), at a temperature of about 86° F. and at a pressure of about 1,176 pounds per square inch absolute (psia). The input stream may include primarily methane along with other hydrocarbons and contaminants. In particular, the methane ($C_1$) may be about 92 volume percent (vol. %), the other hydrocarbons ($C_{2+}$) may be about 8 vol. %, and the water ($H_2O$) may be about 34 pounds per million standard cubic feet (lb/MSCF). The first molecular sieve unit 312 may adjust the stream to form the cryogenic NGL feed stream. The cryogenic NGL feed stream may be provided at a flow rate of 200 million standard cubic feet per day (MSCFD), at a temperature of about 85° F. and at a pressure of about 1,150 pounds per square inch absolute (psia). Further, the first molecular sieve unit 312 may lessen the water ($H_2O$) content to less than 1.0 ppm.

The regeneration stream for a second molecular sieve unit 316 may be heated in the fired heater unit 320 to increase the temperature of the regeneration stream. In particular, the regeneration stream may have a flow rate of 16 MSCFD, may be at a temperature of 550° F. (287.8° C.) and may be at a pressure of 1,150 psia. This stream may pass through the second molecular sieve unit 316, condenser 322 and the separation unit 324. From the separation unit 324, the recycle stream may have a flow rate of 16 MSCFD, may be at a temperature of 115° F. and may be at a pressure of 1,125 psia. This recycle stream may be compressed in the recycle compressor 326 to a pressure of 1,176 psia.

Further, in the cryogenic NGL recovery system 304, the cryogenic NGL feed stream may be provided at a flow rate of 200 MSCFD, at a temperature of about 85° F. (29.4° C.) and at a pressure of about 1,150 pounds per square inch absolute (psia). Further, the first molecular sieve unit 312 may lessen the water ($H_2O$) content to less than 0.1 ppm. The stream from the turboexpander unit 336 may be provided at a flow rate of 150 MSCFD, at a temperature of about −118° F. (−83.3° C.) and at a pressure of about 347 pounds per square inch absolute (psia). The stream provided to the subcooler unit 340 from the demethanizer 344 may be provided at a flow rate of 184 MSCFD, at a temperature of about −147° F. (−99.4° C.) and at a pressure of about 345 pounds per square inch absolute (psia). Further, the stream provided from the compressor 346 to the boost compressor 348 may be provided at a flow rate of 184 MSCFD, at a temperature of about 83° F. (28.3° C.) and at a pressure of about 436 pounds per square inch absolute (psia). The stream from the boost compressor 348 may be provided at a flow rate of 184 MSCFD, at a temperature of about 115° F. (46.1° C.) and at a pressure of about 1,175 pounds per square inch absolute (psia). The stream may have a water ($H_2O$) content of less than 0.1 ppm.

As noted in this example, the regeneration stream (e.g., the purge stream from this process) from the fired heater unit 320 is provided at an elevated temperature of 550° F. (287.8° C.). This high temperature regeneration stream may result in hydrothermal degradation of the adsorbent particles and coke formation within the molecular sieve adsorbent bed leading to deactivation and associated downtime.

Moreover, the particular NGL recovery process may be referred to as the Gas Subcooled Process (GSP) and is suitable for ethane recoveries of up to 90 molar % of the ethane present in the feed stream. As may be appreciated, other cryogenic NGL recovery processes, such as Ortloff's Recycle Split Vapor (RSV) and Single Column Overhead Recycle (SCORE) processes, are well known and can be employed depending on the level of ethane or propane recovery desired. Further, triethylene glycol absorption dehydration system may also be installed upstream at field gathering stations or at the gas plant inlet (not shown) to lessen the feed stream water content below saturation (e.g., about 34 lb/Mscf at conditions described in the example) and may lessen loading on the TSA dehydration system needed to meet the cryogenic processing water specification.

In contrast the conventional system in FIG. 3, the present techniques provides enhancements in the processing of feed streams with adsorbent beds which may be integrated with recovery equipment. For example, the present techniques utilize RCTSA processes to regenerate adsorbent beds at lower temperatures than those utilized in conventional molecular sieve TSA process. Further, this method may be at higher purge gas pressure thus involving less additional compression than PSA approaches. Indeed, the present techniques may be configured to have the purge gas pressure near or at the sales gas pressure to further lessen any compression. As a result, the present techniques overcomes the drawbacks of conventional molecular sieve TSA and PSA approaches by using larger purge gas volumes, not using purge gases heated to higher temperatures (e.g., at or above 500° F. (260° C.)) and not using fire heaters for the purge step.

Figure 4:
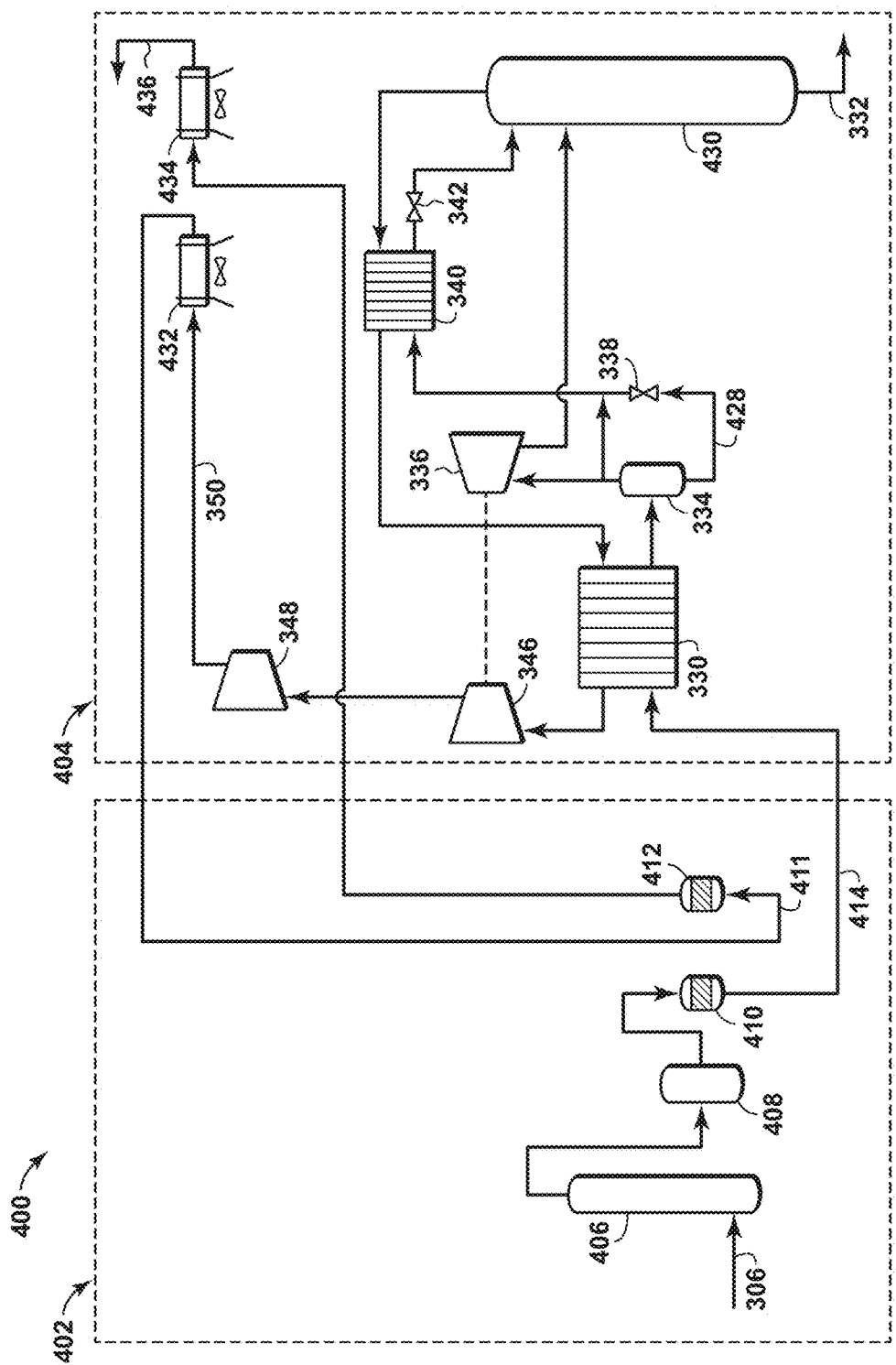
FIG. 4 is an exemplary diagram of the integration of a RCTSA dehydration system with a cryogenic NGL recovery system in accordance with an embodiment of the present techniques.

As an example of these enhancements, FIG. 4 is an exemplary diagram 400 of the integration of a RCTSA dehydration system 402 with a cryogenic NGL recovery system 404 in accordance with an embodiment of the present techniques. This configuration includes a conventional TEG dehydration process at the plant inlet, upstream of the rapid cycle swing adsorption process (e.g., RCTSA) for dehydration. This not only serves to reduce the water loading of the dehydration process, it also provides the flexibility to fine-tune the sales gas water content. As shown above in the example, the sales gas water content from the integrated process is about 5.4 lb/Mscf assuming the feed gas to the RCTSA unit has been dehydrated in the field or at the plant inlet to 5.0 lb/Mscf. The slight increase is due to the removal of the NGLs which causes 5 volume % to 10 volume % shrinkage of the sales gas volume relative to the feed gas volume, depending on the depth of NGL recovery achieved. Thus, the glycol system can be used to meet the sales gas specification by removing sufficient water to account for the shrinkage. This aspect may be modeled to manage the water removal or provide support that this has negligible effect on the economics of the integrated process. Further, other NGL recovery processes, such as RSV and SCORE, can be integrated in a similar manner with RCTSA dehydration by using the residue gas to purge the molecular sieve dehydration beds and recover the water to the sales gas.

In the configuration of FIG. 4, the RCTSA dehydration system 402 may include one or more adsorbent bed units, such as the adsorbent beds units discussed in FIGS. 1 and 2, to perform the dehydration for the input stream. The process may involve performing rapid cycle swing adsorption, which involves using the residue gas from a stream provided from the demethanizer 430 (e.g., a demethanizer overhead stream) at a moderately reduced pressure as the purge stream for the adsorbent bed units. Also, by integrating the RCTSA dehydration system 402 with a cryogenic NGL recovery system 404, various enhancements are provided by such a configuration, which are utilized to lessen costs associated with the process. Further, as the quantity of adsorbents varies inversely and linearly with the cycle time, the present techniques provide adsorbent bed units and components that involve a smaller footprint as compared to conventional systems, such as the configuration noted in FIG. 3.

In this configuration, various equipment, such as units 406, 408, 410 and 412 in the RCTSA dehydration system 402 and units 330, 334, 336, 340, 346, 348, 430, 432 and 434 in cryogenic NGL recovery system 404. The systems 402 and 404 are utilized to process an input stream in conduit 306 to produce an output stream, such as a cryogenic NGL stream in conduit 332. These streams may be similar to those noted in the discussion of FIG. 3. Further, while certain units may be utilized in a manner similar to that noted above in FIG. 3, such as units 330, 334, 336, 340, 346 and 348, this configuration includes variations on the flow path of the streams between these units to provide various enhancements to the process. In this configuration, energy may be conserved by not using fired heaters to provide a high temperature purge gas as in the conventional molecular sieve TSA process, and substantially all of the methane in the feed stream may be recovered as sales gas.

In the RCTSA dehydration system 402, the units are utilized to perform an adsorption step (e.g., a feed step) and a regeneration step in processing the input stream into the cryogenic NGL feed stream. The process begins with an input stream passing through conduit 306 various units 406, 408 and 410 during an adsorption step. The input stream passes initially into a glycol contactor unit 406, which is configured to remove at least a portion of the water from the input stream. The output water content from the glycol contactor unit 406 may be adjusted to be below the water level specification for natural gas sales as all of the water fed to the adsorbent bed units may eventually be associated with the methane used for purging the adsorbent beds, and as the heavier hydrocarbons may have been removed, the volume of the stream may be smaller than that of the initial feed stream. Thus, the water in the stream may be at a higher concentration in the sales gas than it is at the outlet of the glycol contactor unit 406. The output stream from the glycol contactor unit 406 is conducted to the filter unit 408, which is configured to remove particulates and liquid droplets from the stream. The output from the filter unit 408 is the feed stream. Then, the feed stream is conducted to the first adsorbent bed unit 410. The first adsorbent bed unit 410 is configure to separate additional contaminants, such as water from the feed stream. For example, the first adsorbent bed unit 410 may be configured to remove a sufficient portion of the $H_2O$ from the stream, such as the water content of the exiting stream may be less than 2.0 ppm, less than 1.0 ppm or less than 0.1 ppm. The dehydrated output from the first adsorbent bed unit 410 is conveyed away from the first adsorbent bed unit 410 in conduit 414, which is the cryogenic NGL feed stream provided to the cryogenic NGL recovery system 404 as the cryogenic NGL feed stream.

After the adsorption step of the swing adsorption cycle, the pressure is changed to the sales gas pressure. The sales gas pressure may be lower or higher or the same as the feed gas pressure. If the sales gas pressure is lower than the feed gas pressure, then pressure is reduced in one or more blowdown steps. The blowdown step or steps may be performed by flowing the stream in the same direction as the feed stream in the adsorption step, and thus the blowdown gas may have low water or other contaminant content. Thus, it is useful to pass this blowdown stream through a valve (not shown) to the demethanizer 430 via conduit. The blowdown step or steps may be performed by flowing the stream in the opposite direction as the feed stream in the adsorption step and thus the blow down gas may have higher water or other contaminant content. If the sales gas pressure is higher than the feed gas pressure, then pressure is increased in one or more repressurization steps. The repressurization may be performed by flowing the stream in the opposite direction as the feed stream in the adsorption step. The output of the blowdown stream may be combined with the feed stream upstream of the adsorbent bed units, combined with the sales gas stream and/or other downstream processes.

For the purge step, the purge stream is passed in a direction counter to the feed stream direction (e.g., a countercurrent direction) to the second adsorbent bed unit 412 from a first heat exchanger 432 in the cryogenic NGL recovery system 404. Then, the purge output stream or purge product stream from the second adsorbent bed 412 is passed to a second heat exchanger 434. The purge output stream or purge product stream may be passed from the second heat exchanger 434 to sales gas via conduit 436 (e.g., to be stored as sales gas or combined with a sales gas stream).

For the cryogenic NGL recovery system 404, the cryogenic NGL feed stream is processed in a similar manner, as noted above in the discussion of FIG. 3. However, this configuration integrates the flow of streams with the RCTSA dehydration system 402. For example, the cryogenic NGL feed stream is passed to the gas/gas exchanger unit 330 and then processed in the cold separation unit 334, turboexpander unit 336, throttle valve 338, subcooler unit 340 and throttle valve 342, as noted above. However, in this configuration, the demethanizer 430 receives the output stream from the turboexpander unit 336 and/or the output stream from the throttle valve 342. The demethanizer 430 may also receive a blowdown stream from a portion of the output from the second adsorbent bed unit 412. The demethanizer 430 is utilized to separate the stream into the cryogenic NGL output stream (e.g., a final product stream) conducted away from the system 404 in conduit 332 and an overhead stream. The overhead stream is passed to the subcooler unit 340, through the gas/gas exchanger unit 330, through the compressor 346, through the boost compressor 348, and to the first heat exchanger 432. Then, the output stream from the first heat exchanger 432 in the cryogenic NGL recovery system 404 is passed as the purge stream through the second adsorbent bed unit 412 in the RCTSA dehydration system 402 via conduit 411, as noted above. Optionally, a portion of the purge stream in conduit 411 may be diverted to bypass the second adsorbent bed unit 412. The purge output stream or purge product stream may be passed to the second heat exchanger 434 in the cryogenic NGL recovery system 404 from the second adsorbent bed unit 412 in the RCTSA dehydration system 402. The boost compressor 348 further increases the pressure of the stream to the purge pressure, which is at or near the sales gas pressure. The purge product stream or purge output stream may be used for sales gas or utilized in other processes. The pressure of the purge output stream may be within a specific range associated with the feed pressure. By way of example, the purge pressure may be in the range between 40% equal to or less than the feed pressure and 40% equal to or greater than the feed pressure, in the range between 20% equal to or less than the feed pressure and 20% equal to or greater than the feed pressure, in the range between the feed pressure and 40% equal to or greater than the feed pressure, or in the range between the feed pressure and 20% equal to or greater than the feed pressure.

This configuration utilizes a purge stream that is at lower temperatures compared to conventional molecular sieve approaches. The adsorbent bed units 410 and 412, which may be used in a rapid cycle swing adsorption process, are regenerated in a purge step with residue gas from a stream provided from the demethanizer 430 (e.g., a demethanizer overhead stream) at a pressure that is near the sales gas pressure. In this configuration, the demethanizer overhead stream is used as purge gas after heating and recompression in the compressors 346 and 348, which is driven by the turboexpander unit 336. Depending on the NGL content of the feed stream and the extent of NGL recovery, the purge gas flow rate may be in the range between 70 volume % and 95 volume % of the feed flow rate or in a range between 90 volume % and 95 volume % of the feed flow rate. The feed stream may involve pressure in a range between 400 psia and 1,400 psia (or in a range between 600 psia and 1,200 psia), while the demethanizer 430 may operate at pressure in the range between 300 psia and 600 psia range, and the stream pressure after the compressor 346 may be in the range between 400 psia and 600 psia, while the stream pressure after the compressor 348 may be in the range between 400 psia and 1,400 psia or in a range between 600 psia and 1,200 psia. As an example, the feed stream pressure may be 1,000 psia, the demethanizer may operate at a pressure of 345 psia, the purge gas pressure may be 1,100 psia and thus the adsorbent bed pressure swings from about 1,000 psia to 1,100 psia. In this configuration, the purge gas temperature is greater than the feed gas temperature. For example, the feed stream temperature may be a temperature of about 86° F., the demethanizer overhead stream is heated in a subcooler unit 340 and the gas/gas exchanger from −147° F. to 83° F. by heat exchange and compression in the compressors 346 and 348 and cooling in heat exchanger 432 to a purge temperature of 100° F. Thus, the adsorbent bed temperature may change during the adsorption step and desorption step (e.g. the purge step) of the cycle. As an example, the feed stream and purge stream flow rates and adsorption step and desorption step may be a time period of fifty seconds (adsorption step), one-hundred seconds (purge step) and the remaining fifty seconds is for holds and/or de-pressurization and re-pressurization steps, respectively, in a two-hundred second cycle.

As an example, four adsorbent beds may be used to treat 200 MSCFD of wet feed stream, where each adsorbent bed unit has a diameter of 0.92 meters (m) and a length of 0.65 m. In this example, each bed is composed of adsorbent-coated parallel channels arranged in a monolith with over 2,900 channels per square inch, and the channels are separated by 25.4 micron steel walls and coated internally with a 60 micron layer of porous adsorbent. In this example, the typical heat capacity of the adsorber bed was about 7.0 Joules per gram adsorbent per degree Kelvin (J/g adsorbent/ K). Each adsorbent bed contains a total of about 75 kilograms (kg) of adsorbent giving a total of 300 kg for the process. In addition, the present techniques do not require a narrow mass transfer zone, thus a wide range of adsorbents can be used for rigorous water removal. These include but are not limited to silica gel, Zeolite 3A, 4A and 5A.

These adsorbent bed units may be used in the configuration of FIG. 4. In particular, the input stream may be provided at a flow rate of 200 million standard cubic feet per day (MSCFD), at a temperature of about 86° F. (30° C.) and at a pressure of about 1,000 pounds per square inch absolute (psia). The input stream may include primarily methane along with other hydrocarbons and contaminants. By way of example, the methane ($C_1$) may be about 92 molar percent (mol. %), the other hydrocarbons ($C_{2+}$) may be about 8 mol. %, and the water ($H_2O$) may be about 34 lb/MSCF. The stream from the glycol contactor unit 406 may be provided at a flow rate of 200 MSCFD, at a temperature of about 86° F. and at a pressure of about 1,000 pounds per square inch absolute (psia). The stream may include primarily methane and the water ($H_2O$) may be about 5 lb/MSCF. The stream is then passed through the filter 408 and provided to the first adsorbent bed unit 410 may adjust the stream to form the cryogenic NGL feed stream. The cryogenic NGL feed stream from the first adsorbent bed unit 410 may be provided at a flow rate of 201 MSCFD, at a temperature of about 86° F. and at a pressure of about 985 psia. Further, the first adsorbent bed unit 410 may lessen the water ($H_2O$) content to less than 1.0 ppm.

For the regeneration, the purge stream is provided to the second adsorbent bed unit 412 may have a flow rate of 184 MSCFD, may be at a temperature of 100° F. and may be at a pressure of 1,100 psia. From the second adsorbent bed unit 412, the purge vent stream or purge product stream may have a flow rate of 183 MSCFD, may be at a temperature of 95° F. and may be at a pressure of 1,085 psia, while the blowdown stream may have a flow rate of 1 MSCFD, may be at a temperature of 86° F. and may be at a pressure of 1,000 psia.

Further, in the cryogenic NGL recovery system 404, the cryogenic NGL feed stream from the first adsorbent bed unit 410 may be provided to the gas/gas exchanger unit 330 at a flow rate of 201 MSCFD, at a temperature of about 86° F. and at a pressure of about 985 psia. Further, the first adsorbent bed unit 410 may lessen the water ($H_2O$) content to less than 0.1 ppm. Further, the stream provided from the turboexpander unit 336 to the demethanizer 430 may be provided at a flow rate of 149 MSCFD, at a temperature of about –119° F. and at a pressure of about 347 pounds per square inch absolute (psia), while the stream from the subcooler unit 340 to the demethanizer 430 may be provided at a flow rate of 49 MSCFD, at a temperature of about –119° F. and at a pressure of 347 pounds per square inch absolute (psia). From the demethanizer 430, the overhead stream (e.g., demethanizer overhead flow rate) may be provided at a flow rate of 184 MSCFD, at a temperature of about –147° F. and at a pressure of about 345 pounds per square inch absolute (psia). Further, the stream provided from the compressors 346 and 348 to the heat exchanger 432 and then the second adsorbent bed unit 412 may be provided at a flow rate of 184 MSCFD, at a temperature of about 100° F. and at a pressure of 1,100 pounds per square inch absolute (psia). Further, the purge output stream from the second adsorbent bed 412 may be provided at a flow rate of 183 MSCFD, at a temperature of about 95° F. and at a pressure of about 1,085 pounds per square inch absolute (psia). The stream may have a water ($H_2O$) content of less than about 5.4 lb/MSCF.

In this diagram 400, the adsorbent beds are regenerated via a purge step with a purge stream that is from the overhead stream of the demethanizer 430. The purge stream may have a composition substantially similar to that of the overhead stream from the demethanizer 430 and be at a flow rate that is substantially similar, as well. For example, the flow rate of the purge stream may be associated with the flow rate of the demethanizer overhead stream from the demethanizer 430. The purge stream may comprise at least 20 volume % of the demethanizer overhead stream, at least 50 volume % of the demethanizer overhead stream, at least 80 volume % of the demethanizer overhead stream or at least 95 volume % of the demethanizer overhead stream. For example, in the configuration of diagram 400, the purge stream comprises the demethanizer overhead flow rate (e.g., about 100 volume %).

Further, in this configuration, the purge stream is provided at a temperature equal to or greater than the temperature of the feed stream. For example, the purge stream temperature may be within a range between 70° F. and 450° F., within a range between 70° F. and 300° F. or within a range between 90° F. and 175° F.

As another example, three adsorption beds may be used to treat 200 MSCFD of wet feed gas. Each adsorbent bed has a diameter of 0.6 m and a length of 0.25 m. Each adsorbent bed is composed of adsorbent-coated parallel channels arranged in a monolith with over 2000 channels per square inch. Each adsorbent bed contains a total of about 22 kilograms (kg) of adsorbent, giving a total of 66 kg used for the entire process. In addition, the present techniques do not require a narrow mass transfer zone, thus a wide range of adsorbent materials can be used for rigorous water removal. These include but are not limited to silica gel, Zeolite 3A, 4A and 5A.

At any given time during the cycle, one adsorption bed is on an adsorption step (e.g., feed) and two adsorption beds are on purge step. The two adsorbent beds performing a purge step have a time offset such that once one adsorbent bed is halfway complete with its purge step; while another adsorbent bed begins its purge step. Having two adsorbent beds simultaneously performing purge steps, with the half purge time offset, damps water composition pulsations allowing for the sales gas water specification to be met continuously.

By way of example, the rapid cycle swing adsorption processes are regenerated by purging with residue gas (e.g., stream from the demethanizer overhead) at a pressure that coincides with the sales gas pressure. The sales gas pressure is specified by the sales pipeline and can be higher or lower than the feed pressure. The entire or a portion of the demethanizer overhead stream is used as purge gas after heating and recompression in the boost compressor (also termed as the residue gas compressor). Only a slip stream of the demethanizer overhead may be used in other configurations. Depending on the NGL content of the feed gas, and the extent of NGL recovery, the purge gas flow rate may be 80 volume % to 95 volume % of the feed gas rate. The typical pressure after the boost compressor may be in the range 800 psia to 1300 psia at a temperature in the range between 150° F. to 300° F. Prior to being used for adsorbent bed regeneration the purge gas is cooled to 95° F.-175° F. in the air-cooler. The benefits of cooling the purge gas are twofold. First, a more gradual release of the adsorbed water from the adsorbent bed, which is a required feature of the process, such that $H_2O$ sales gas specification satisfied over the course of the purge step. Second, the present techniques may decrease material fatigue due to rapid thermal cycling. In the example, the feed gas is at 86° F. and the purge gas at 100° F., giving an overall temperature swing of 14° F. The large amount of available purge gas provides for the slight temperature swing to desorb the water adsorbed during the feed step. Depending on the pressure differential between the feed gas and sales gas, the adsorbent bed may be pressurized, depressurized or held at constant pressure prior to purge regeneration. Further, the feed gas in the example is at a pressure of 1000 psia and the sales gas at 1100 psia, so the pressure in the adsorbent bed is increased 100 psi prior to purge regeneration. If no stringent specification for temperatures of the sales gas, cooling of the purge gas stream may not be necessary.

Beneficially, this configuration may remove any additional heat exchanger or furnace from the process flow. Further, the purge stream may be provided at lower temperature and higher volumes than other processes. As the purge stream is provided at a lower temperature, it involves less heat than the regenerated gas in the conventional TSA process of FIG. 3 even through the volume of the purge stream is larger.

The enhancements of the present techniques are further illustrated by comparing the two processes. For example, to perform the same dehydration of a feed stream, the process in the conventional molecular sieve process, as noted in FIG. 3, the purge stream temperature is 500° F. (260° C.) or higher, while the rapid cycle TSA utilizes a purge stream at 100° F. (37.8° C.). Further, the present techniques utilize less adsorbent material as compared to the conventional molecular sieve process. For example, the adsorbent utilized in the configuration of FIG. 4 is 300 kg, while the conventional TSA molecular sieve process in FIG. 3 requires three adsorbent beds, each containing about 38,000 kg of zeolite 4A adsorbent for a total of 114,000 kg of adsorbent. Thus, the conventional process is a factor of 380 larger than the process of the present techniques. Accordingly, each of the four adsorbent bed units of the configuration of FIG. 4 has a diameter of 0.92 m and a length of 0.65 m, while the unit for the conventional TSA molecular sieve process are roughly 1.4 m in diameter and 6.7 m long. Thus, the footprint for the present techniques is significantly less than the conventional TSA molecular sieve process. This configuration may be adjusted for different pressures, temperatures, flow rates, durations, bed counts, dimensions and weights.

In one or more embodiment, the glycol contactor unit 406 may be a tri-ethylene glycol (TEG) dehydration process may be used on the input stream at the inlet, upstream of the RCTSA dehydration process. This unit may be used to reduce the water loading of the dehydration process, and to provide the flexibility to adjust the sales gas water content. As shown above in the example, the sales gas water content from the integrated process may be about 5.4 lb/Mscf assuming the stream provided to the RCTSA dehydration system 402 has been dehydrated in the field or at the plant inlet to 5.0 lb/Mscf. The slight increase is due to the removal of the NGLs which causes 5 molar % to 10 molar % shrinkage of the sales gas volume relative to the feed stream volume, depending on the depth of NGL recovery achieved. Thus, the glycol system can be used to meet the sales gas specification by removing sufficient water to account for the shrinkage. Modeling shows that this has negligible effect on the economics of the integrated process.

In other embodiments, other NGL recovery processes, such as RSV and SCORE, can be integrated in a similar manner with RCTSA dehydration system in this configuration by using the demethanizer overhead stream (e.g., residue gas) to purge the adsorbent beds and recover the water to the sales gas.

Figure 5:
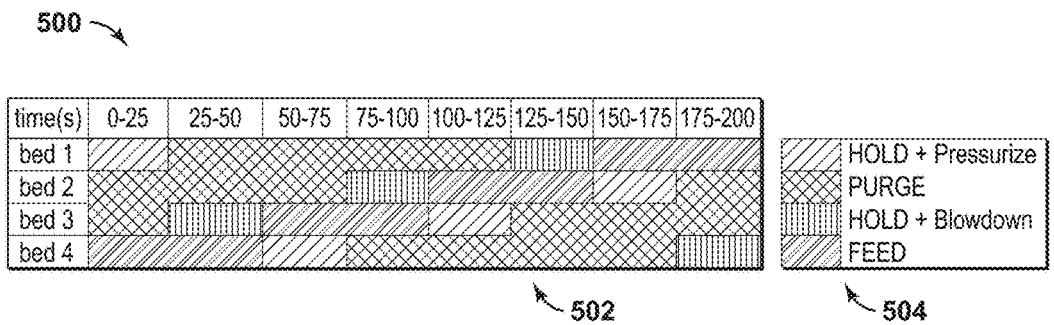
FIG. 5 is an exemplary chart associated with the configuration in FIG. 4 in accordance with an embodiment of the present techniques.

FIG. 5 is exemplary chart 500 associated with the configuration in FIG. 4 in accordance with an embodiment of the present techniques. The diagram 500 describes the timing and steps for an exemplary cycle of the swing adsorption process in timing chart 502 and the associated legend 504. In diagram 500, the step being performed in the individual adsorbent beds, such as adsorbent beds 1 to 4. The timing of the steps in the cycle is divided into 25 second intervals.

As shown in diagram 500, the cycle includes performing various steps in specific flow directions relative to the flow of the feed stream (e.g., co-flow is in the same direction as the feed stream and counter-flow is in the direction opposite of the feed stream through the adsorbent bed). These steps involve a hold and pressurize step, a purge step, a hold and blowdown step, and a feed step.

Figure 6:
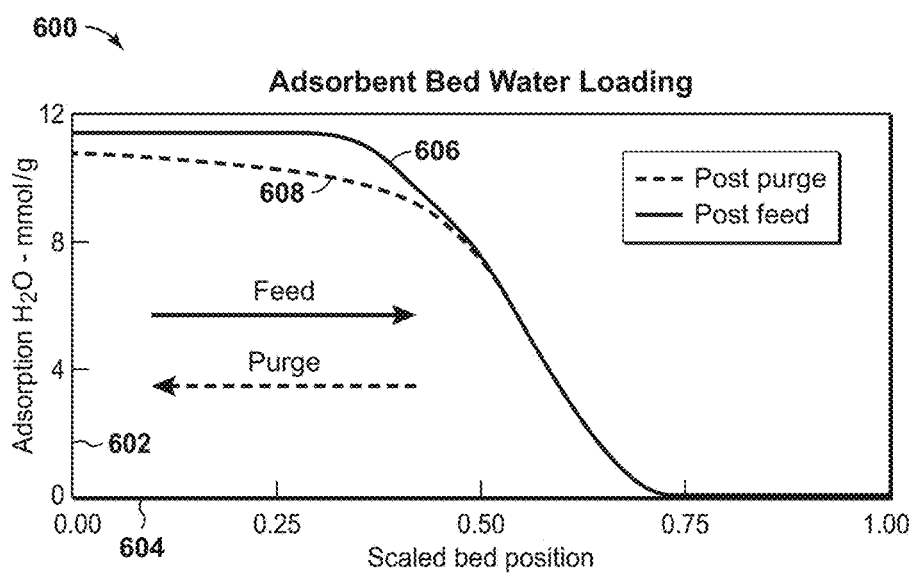
FIG. 6 is an exemplary diagram of adsorbent bed water loading associated with the configuration in FIG. 4 in accordance with an embodiment of the present techniques.

FIG. 6 is an exemplary diagram 600 of adsorbent bed water loading associated with the configuration in FIG. 4 in accordance with an embodiment of the present techniques. In the diagram 600, the adsorbent bed water loading responses 606 and 608 in the diagram 600 are shown along adsorption water ($H_2O$) axis 602 in millimoles per gram (mmol/g) with respect to the scaled bed position 604 in normalized bed length (z/L). The response 606 represents post feed as compared with the scaled bed position, while the response 608 represents post purge as compared with the scaled bed position. Each of these responses 606 and 608 are the water loading at the various times during the step. The leading edge of the adsorption front for each of the responses 606 and 608 do not increase in the latter region of the adsorbent bed (e.g., product region or portion near the product end). In particular, for this example, the product region of the adsorbent bed is the portion of the absorbent bed from the product end to about 50% of the bed length from the product end of the adsorbent bed and is maintained with a water loading for the product region less than about 1 mole per kilogram (mol/kg).

Figure 7:
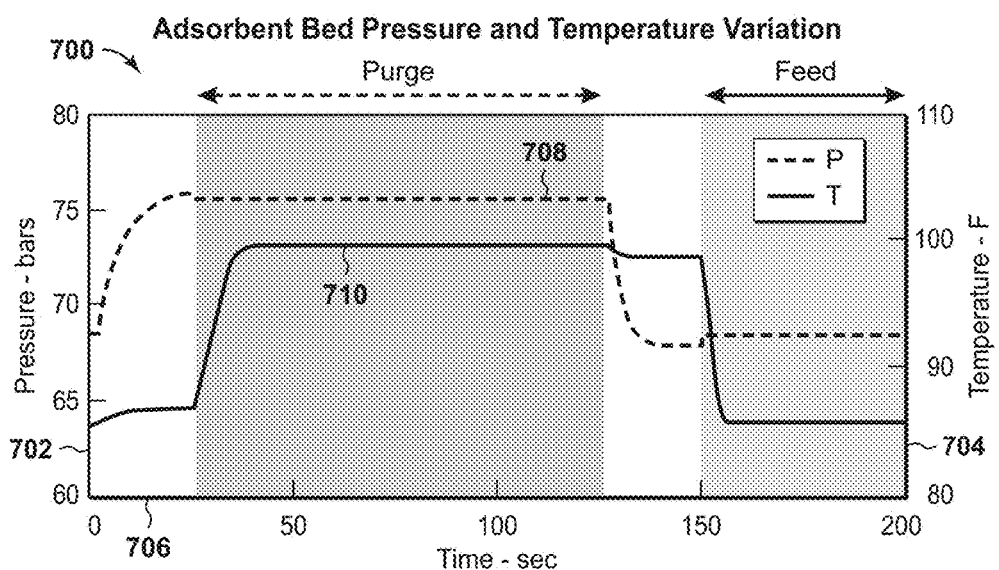
FIG. 7 is an exemplary diagram of adsorbent bed pressure and temperature variations associated with the configuration in FIG. 4 in accordance with an embodiment of the present techniques.

FIG. 7 is an exemplary diagram 700 of adsorbent bed pressure and temperature variations associated with the configuration in FIG. 4 in accordance with an embodiment of the present techniques. In the diagram 700, the adsorbent bed pressure and temperature variation responses 708 and 710 are shown along pressure axis 702 in bars and along temperature axis 706 in degrees Farienhiet (° F.) with respect to time axis 704 in seconds (s). The response 710 represents temperature variations during the cycle, while the response 708 represents a pressure variations during the cycle. The time period from 25 seconds to 125 seconds is the purge step, while the time period from 150 seconds to 200 seconds is the feed step (e.g., adsorption step).

Figure 8:
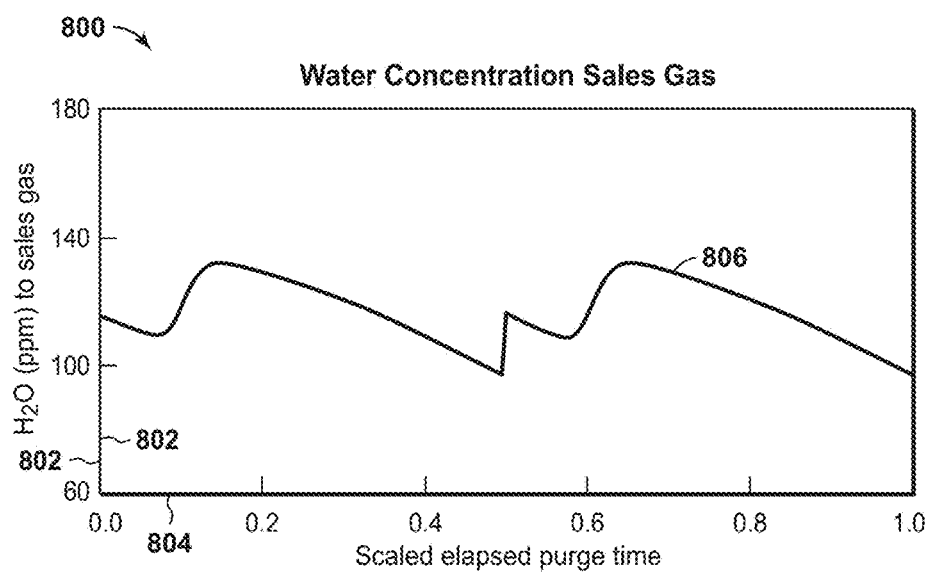
FIG. 8 is an exemplary diagram water concentration sales gas associated with the configuration in FIG. 4 in accordance with an embodiment of the present techniques.

FIG. 8 is an exemplary diagram 800 water concentration sales gas associated with the configuration in FIG. 4 in accordance with an embodiment of the present techniques. In the diagram 800, the water concentration response 806 are shown along the water ($H_2O$) to sales gas axis 802 in ppm with respect to the scaled lapsed purge time axis 804 in seconds. The response 806 represents variations in water concentration of the sales gas.

The dehydration of the feed stream for the cryogenic CFZ™ recovery system may the use rapid cycle swing adsorption processes and units to dehydrate this stream. In the cryogenic Controlled Freeze Zone™ recovery system, various steps may be utilized to dehydrate the stream. For example, the steps may be similar to the steps used in a configuration of FIG. 4. As noted above for FIG. 4, the purge stream may be at least a portion of the demethanizer overhead stream, which may be the vapor methane stream from the CFZ™ process in the CFZ™ system. This purge stream may be provided at pressures in the range between 400 psia and 1,400 psia.

As an example of these enhancements, the integration of a RCTSA dehydration system 402 with a cryogenic CFZ™ recovery system may be another embodiment of the present techniques. In this configuration, the RCTSA dehydration system 402 may include one or more adsorbent bed units, such as the adsorbent beds units discussed in FIGS. 1 and 2, to perform the dehydration for the input stream. The process may involve performing rapid cycle swing adsorption, which involves using the residue gas from a stream provided from the demethanizer (e.g., a demethanizer overhead stream) at a purge pressure, within the range between 400 psia and 1,400 psia, for example, as the purge stream for the adsorbent bed units. Also, by integrating the RCTSA dehydration system 402 with a cryogenic CFZ™ recovery system, various enhancements are provided by such a configuration, which are utilized to lessen costs associated with the process. Further, as the quantity of adsorbents varies inversely and linearly with the cycle time, the present techniques provide adsorbent bed units and components that involve a smaller footprint as compared to conventional systems.

In this configuration, various equipment, such as units 406, 408, 410 and 412 in the RCTSA dehydration system 402 and units in cryogenic CFZ™ recovery system, may be used in the process. The systems 402 and cryogenic CFZ recovery system are utilized to process an input stream in conduit 306 to produce a final output stream, such as a cryogenic CFZ stream in conduit. The streams in the dehydration system 402 may be similar to the streams noted in the discussion of FIG. 4. Further, while certain units may be utilized in a manner similar to that noted above in FIG. 4, such as units 406, 408, 410, 348 and 412, this configuration includes variations on the flow path of the streams between these units to provide various enhancements to the process. In this configuration, energy may also be conserved by not using fired heaters and substantially all of the methane in the feed stream may be recovered as sales gas.

In the RCTSA dehydration system 402, the units are utilized to perform an adsorption step (e.g., a feed step) and a regeneration step in processing the input stream into the cryogenic CFZ feed stream. The process begins with an input stream passing through conduit 306 various units 406, 408 and 410 during an adsorption step. The first adsorbent bed unit 410 is configure to separate additional contaminants, such as water from the feed stream. For example, the first adsorbent bed unit 410 may be configured to remove a sufficient portion of the $H_2O$ from the stream, such as the water content of the exiting stream may be less than 2.0 ppm, less than 1.0 ppm or less than 0.1 ppm. The dehydrated output from the first adsorbent bed unit 410 is conveyed away from the first adsorbent bed unit 410 in conduit 414, which is the cryogenic CFZ feed stream provided to the cryogenic CFZ recovery system as the cryogenic CFZ feed stream.

Further, in other embodiments, the heavy hydrocarbons from the feed stream to the CFZ process may be removed by the rapid cycle swing adsorption process. The removal of heavy hydrocarbons may involve a separate set of adsorbent bed units or may be integrated with the adsorbent bed units represented by adsorbent bed units 410 and 412. In such configurations, the purge stream may utilize more of the demethanizer overhead stream, which may also be provided at an elevated temperature to further enhance the process.

In one or more embodiments, the material may include an adsorbent material supported on a non-adsorbent support. Non-limiting examples of adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups, which may be used for $CO_2$ removal, may include primary, secondary, tertiary amines and other non protogenic basic groups such as amidines, guanidines and biguanides.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a purge step, wherein the purge step reduces the pressure within the adsorbent bed unit and wherein the purge step involves passing a purge stream to a mid-purge distribution zone between first portion and the second portion; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the points or places at which a feed stream enters the contactor and the point or place at which a product stream leaves the contactor. In the contactor, the adsorbent is incorporated into the wall of the flow channel.

In one or more embodiments, the rapid cycle swing adsorption process in the present techniques is a rapid cycle temperature swing adsorption (RCTSA) and a pressure swing adsorption (PSA). For example, the total cycle times are typically less than 1200 seconds, less than 600 seconds, less than 300 seconds, preferably less than 200 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorption process for removing contaminants from a gaseous feed stream, the process comprising:
   a) performing one or more adsorption steps, wherein each of the adsorption steps comprises passing a gaseous feed stream at a feed pressure and feed temperature through an adsorbent bed unit to remove one or more contaminants from the gaseous feed stream and to form a product stream that is passed to a cryogenic recovery system including a demethanizer;

b) performing one or more purge steps, wherein each of the purge steps comprises passing a purge stream through the adsorbent bed unit in a counter flow direction relative to the flow of the gaseous feed stream to form a purge product stream, wherein the purge stream comprises at least a portion of a demethanizer overhead stream from the demethanizer, wherein the purge pressure is between 40%+/− of the feed pressure;

c) performing one or more blowdown steps, wherein each of the blowdown steps comprises passing a blowdown outlet stream from the adsorbent bed unit to the feed stream, wherein the one or more blowdown steps reduce the pressure within the adsorbent bed unit by a predetermined amount to the feed pressure; and d) repeating the steps a) to c) for at least one additional cycle.

2. The cyclical swing adsorption process of claim 1, wherein the purge stream comprises at least 20 volume % of the demethanizer overhead stream.

3. The cyclical swing adsorption process of claim 1, wherein the purge stream comprises at least 50 volume % of the demethanizer overhead stream.

4. The cyclical swing adsorption process of claim 1, wherein the purge stream comprises at least 95 volume % of the demethanizer overhead stream.

5. The cyclical swing adsorption process of claim 1, further comprising passing the purge product stream to sales gas, wherein the pressure of the purge output stream is within a range of 5% of a sales gas pressure of a sales gas stream.

6. The cyclical swing adsorption process of claim 1, wherein the purge pressure is between 20%+/− of the feed pressure.

7. The cyclical swing adsorption process of claim 1, wherein the purge pressure is in the range between the feed pressure and 40% greater than the feed pressure.

8. The cyclical swing adsorption process of claim 1, wherein the purge pressure is in the range between the feed pressure and 20% greater than the feed pressure.

9. The cyclical swing adsorption process of claim 1, wherein the purge stream is at a purge temperature within a range between 70° F. and 450° F.

10. The cyclical swing adsorption process of claim 1, wherein the purge stream is at a purge temperature within a range between 70° F. and 300° F.

11. The cyclical swing adsorption process of claim 1, wherein the cycle duration is greater than 1 second and less than 1200 seconds.

12. The cyclical swing adsorption process of claim 1, wherein the gaseous feed stream is a hydrocarbon containing stream having greater than one volume percent hydrocarbons based on the total volume of the feed stream.

13. The cyclical swing adsorption process of claim 1, wherein the gaseous feed stream comprises hydrocarbons and $H_2O$, wherein the $H_2O$ is one of the one or more contaminants and the gaseous feed stream comprises $H_2O$ in the range of two parts per million molar to saturation levels in the gaseous feed stream.

14. The cyclical swing adsorption process of claim 1, wherein the gaseous feed stream comprises hydrocarbons and $H_2O$, wherein the $H_2O$ is one of the one or more contaminants and the gaseous feed stream comprises $H_2O$ in the range of 50 parts per million molar to 1,500 parts per million molar.

15. The cyclical swing adsorption process of claim 1, wherein the gaseous feed stream comprises hydrocarbons and $CO_2$, wherein the $CO_2$ is one of the one or more contaminants and the gaseous feed stream comprises $CO_2$ in the range between 0 molar percent and 5 molar percent of the total volume of the gaseous feed stream.

16. The cyclical swing adsorption process of claim 1, wherein the gaseous feed stream comprises hydrocarbons and the one or more contaminants comprising $CO_2$, wherein the $CO_2$ in the gaseous feed stream is less than the quantity of one minus the molar fraction of heavy hydrocarbons in the gaseous feed stream times a sales gas $CO_2$ maximum concentration specification.

17. The cyclical swing adsorption process of claim 1, wherein the feed pressure is in the range between 400 pounds per square inch absolute (psia) and 1,400 psia.

18. The cyclical swing adsorption process of claim 1, wherein the cycle duration is greater than 2 seconds and less than 600 seconds.

19. The cyclical swing adsorption process of claim 1, wherein water content in the product stream is in the range between 0.0 ppm and 5.0 ppm.

20. The cyclical swing adsorption process of claim 1, wherein the cryogenic recovery system is a cryogenic natural gas liquids recovery system.

21. The cyclical swing adsorption process of claim 1, wherein the cryogenic recovery system is a cryogenic controlled freeze zone recovery system.

22. The cyclical swing adsorption process of claim 1, wherein the adsorbent bed unit comprises an adsorbent material of Zeolite 3A, Zeolite 4A or Zeolite 5A.

23. A system for removing contaminants from a gaseous feed stream, the system comprising:
   one or more adsorbent bed units, wherein each of the one or more adsorbent bed units is configured to separate contaminants from a gaseous feed stream and to output a product stream, wherein the gaseous feed stream is provided at a feed temperature and a feed pressure;
   a cryogenic recovery system configured to receive the product stream and pass at least a portion of the product stream to a demethanizer to separate the at least a portion of the product stream into a final product stream and a demethanizer overhead stream, wherein the cryogenic recovery system comprises a gas/gas exchanger unit configured to receive the product stream from the adsorbent bed unit and to lower the temperature of the product stream by heat exchange with the at least portion of the demethanizer overhead stream to produce an exchanger output stream; and
   wherein a purge stream is configured to be passed through the each of the one or more adsorbent bed units and comprises at least portion of the demethanizer overhead stream, wherein the purge pressure is between 40%+/− of the feed pressure.

24. The system of claim 23, further comprising:
   a glycol contactor unit configured to receive an input stream and to remove at least a portion of the water from the input stream; and
   a filter unit configured to receive a glycol output stream from the glycol contactor unit and to conduct away particulates and liquid droplets and to provide the feed stream to the one or more adsorbent bed units, wherein the gaseous feed stream is below saturation levels.

25. The system of claim 23, further comprising one or more conduits that are configured to pass a purge product stream from the one or more adsorbent bed units to a storage unit as a sales gas stream.

26. The system of claim 23, further comprising a subcooler unit configured to receive a portion of the exchanger output stream from the gas/gas exchanger unit and to adjust the temperature of the portion of the exchanger output stream to the desired temperature for the demethanizer by heat exchange with the at least portion of the demethanizer overhead stream.

27. The system of claim 23, further comprising a compressor configured to:
receive the demethanizer overhead stream from the gas/gas exchanger unit; increase the pressure of the demethanizer overhead stream into a compressed demethanizer overhead stream; and
provide the compressed demethanizer overhead stream to a regeneration adsorbent bed unit as the purge stream.

28. The system of claim 23, wherein the cryogenic recovery system is a cryogenic natural gas liquids recovery system.

29. The system of claim 23, wherein the cryogenic recovery system is a cryogenic controlled freeze zone recovery system.

* * * * *